United States Patent
Asveren et al.

(10) Patent No.: US 11,307,945 B2
(45) Date of Patent: Apr. 19, 2022

(54) METHODS AND APPARATUS FOR DETECTING, ELIMINATING AND/OR MITIGATING SPLIT BRAIN OCCURRENCES IN HIGH AVAILABILITY SYSTEMS

(71) Applicant: Ribbon Communications Operating Company, Inc., Westford, MA (US)

(72) Inventors: Tolga Asveren, Bordentown, NJ (US); Howard Elliot Finer, Stoughton, MA (US); Hemanth Kumar Yathiraju Chenji, Nashua, NH (US); George J. Matey, Nashua, NH (US); Mark St. Pierre, Groton, MA (US); Subhransu S. Nayak, Acton, MA (US)

(73) Assignee: Ribbon Communications Operating Company, Inc., Westford, MA (US)

(*) Notice: Subject to any disclaimer, the term of this patent is extended or adjusted under 35 U.S.C. 154(b) by 0 days.

(21) Appl. No.: 17/140,737

(22) Filed: Jan. 4, 2021

(65) Prior Publication Data
US 2021/0124656 A1    Apr. 29, 2021

Related U.S. Application Data

(63) Continuation of application No. 16/222,508, filed on Dec. 17, 2018, now Pat. No. 10,909,008.

(51) Int. Cl.
*G06F 11/00* (2006.01)
*G06F 11/20* (2006.01)

(52) U.S. Cl.
CPC ...... *G06F 11/2023* (2013.01); *G06F 11/2028* (2013.01); *G06F 2201/835* (2013.01)

(58) Field of Classification Search
CPC ............. G06F 11/2033; G06F 11/0709; G06F 11/2028; G06F 11/202; G06F 11/2023; G06F 11/3006; G06F 11/3055
See application file for complete search history.

(56) References Cited

U.S. PATENT DOCUMENTS

| | | | | |
|---|---|---|---|---|
| 5,978,933 A | * | 11/1999 | Wyld | G06F 11/1482 |
| | | | | 714/13 |
| 10,114,713 B1 | * | 10/2018 | Chen | H04L 43/0817 |
| 2010/0088440 A1 | * | 4/2010 | Banks | G06F 11/2028 |
| | | | | 710/109 |

* cited by examiner

*Primary Examiner* — Charles Ehne
(74) *Attorney, Agent, or Firm* — Straub & Straub; Stephen T. Straub; Michael P. Straub

(57) ABSTRACT

The present invention relates to communications methods and apparatus for detecting and/or mitigating split brain occurrences in high availability systems. A split brain condition being a condition wherein both a standby processing node and another processing node of a cluster of processing nodes included in a high availability system are both operating at the same time in an active mode of operation. An exemplary method embodiment of operating a high availability system including a plurality of processing nodes includes the steps of determining at a standby processing node that a failure condition exists, said standby processing node being one of the cluster of processing nodes; switching the standby processing node from a standby mode of operation to an active mode of operation in response to determining that a failure condition exists; and determining whether the high availability system is experiencing a split brain condition.

20 Claims, 10 Drawing Sheets

```
6000  raf = SIP Application Interface state to be assumed after detection of "false alarm" from
            from existing HA-link mechanism. Possible values are "UP" and "DOWN".
            "raf configuration for Active Server and Standby Server will be done in a way
              where one value is used by each, i.e. (Active Server raf = DOWN, Standby Server
              raf =UP) or (Active Server raf = UP, Standby Server raf = DOWN)

6010  SIP Probe messages are sent and responses cached in memory. If the cached value is
          is stale (determined based on a configured time value) when it needs to be accessed,
          node waits for generation of next cached value (which would be a success response or
          a timeout)

6020  SIP Probe requests will have a signed timestamp as a parameter in the SIP probe
          request Via header, which would also be present in the reply. This is used to defend
          against replay attacks.

6030  HA-link messages are sent, replies receives.

6040  HA-link logic in node determines that the other node is down
6050  IF SIP Probing to the other node == success
6060  /* The other node is not down */
6070              IF raf == UP
6080              /* SIP Application interface needs to stay up and it already is up */
6090  Do nothing
6200              ELSE
6210              /* This node will stay active but won't be able to send/receive */
6220              /* packets/messages for SIP Application */

6230              /* SIP Probing interface is still active */
6240                     Bring SIP Application interface/port down 6250  ELSE
6260  /* SIP Probing to the other node is not successful */
6270  /* Use SIP Probing information to external servers (optional step) */
6280              IF SIP Probing to external servers == success
6290              /* The other node is likely down */
6300              /* This node is already active and it should stay active */
6310                     Do nothing
6320              ELSE
6330              /* SIP Probing to external nodes is not successful */
6340              /* This node is isolated, the other node is likely up */
6350              /* This node will stay active but will not be able to send/receive */
6360              /* packets/messages for SIP Application */
6370              /* SIP Probing interface is still active */
6380                     Bring SIP Application interface/port down
```

```
6390 HA-link logic of node determines that HA-link is established after a failure
6400 /* This is existing HA-link capability. */
6410 /* The failed entity recovered and HA-link is established between the two nodes */
6420 /*  of the redundancy cluster */

6430 mode after recovery:  This is mode of the node it is assigned after recovery.  It is
     determined by existing HA-link mechanism.

6440 IF (raf == DOWN) AND (mode after recovery == Active)
                   /* SIP Application interface should be up on this node as it is */
6450              /* selected as the Active Server by HA-link mechanism after HA-link */
6460              /* is reestablished */
6470              /* Still bring it up if not up already to prevent glitches/unforeseen issues */
6480              Bring SIP Application UP if it is not already UP
6490 ELSE
6500 IF (raf == UP) AND mode after recovery == Standby)
6510              /* SIP Application interface on this node was up before HA-link */
6520              /* is reestablished   */
6530              /*  Now it needs to be brought down as HA-link mechanism assigned */
6540              /* Standy role for this node */
6550              Bring SIP Application interface DOWN if it is not already DOWN
6560 ELSE
6570              Do nothing
```

| FIGURE 6A |
|-----------|
| FIGURE 6B |

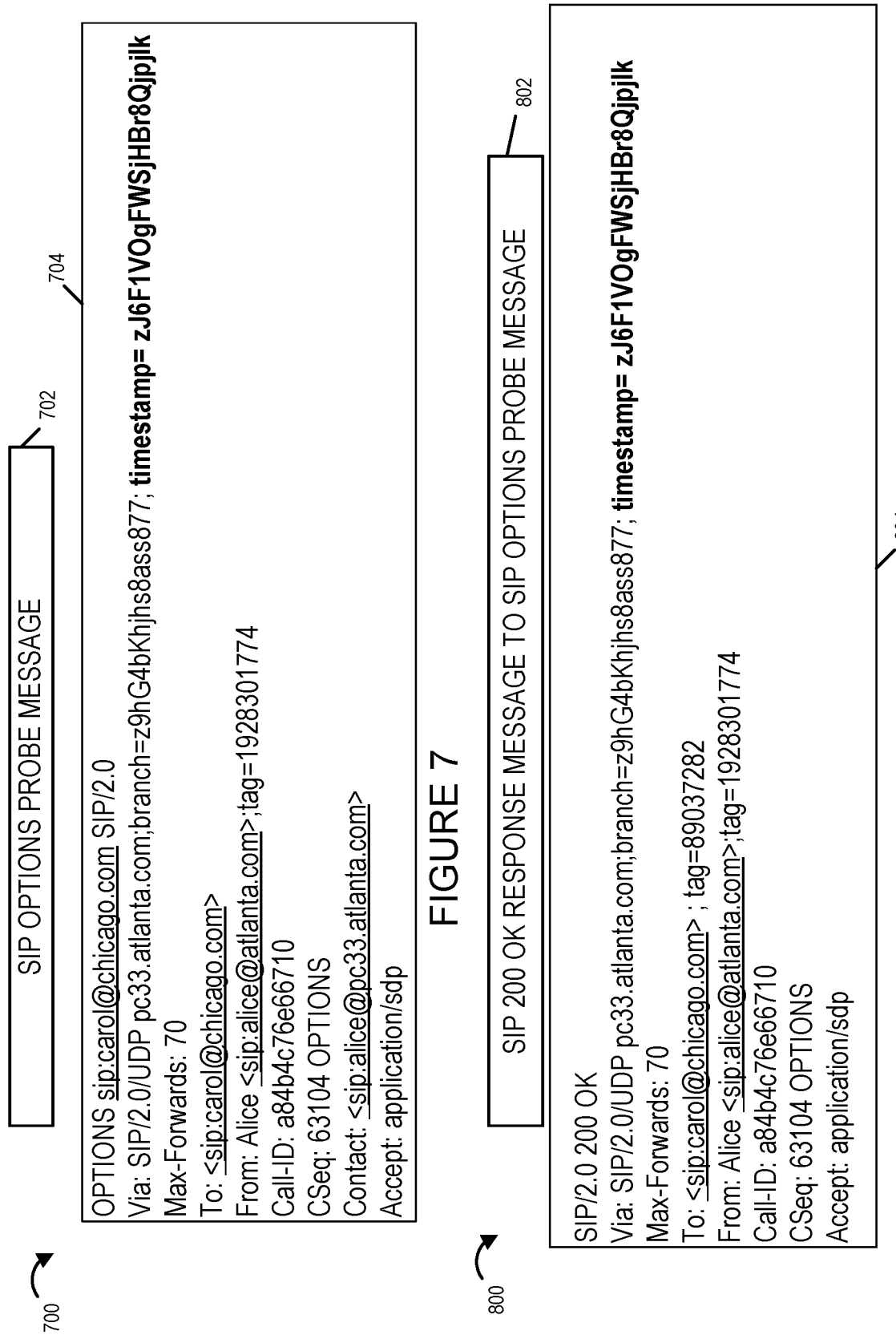

US 11,307,945 B2

METHODS AND APPARATUS FOR DETECTING, ELIMINATING AND/OR MITIGATING SPLIT BRAIN OCCURRENCES IN HIGH AVAILABILITY SYSTEMS

RELATED APPLICATIONS

The present application is a continuation of U.S. patent application Ser. No. 16/222,508 filed on Dec. 17, 2018 which published on Jun. 18, 2020 as U.S. Patent Application Publication No. US 2020-0192772 A1 each of the aforementioned documents being expressly incorporated herein by reference in their entirety.

FIELD OF INVENTION

The present invention relates to communications methods and apparatus for detecting, reducing and/or eliminating and/or mitigating the effects of split brain occurrences or scenarios for High Availability (HA) systems, e.g., network communications systems that utilize High Availability Pair deployments based on an Active/Standby paradigm.

BACKGROUND

Mission critical systems in general and core network communication systems in particular rely on High Availability (HA) Pair deployments based on an Active/Standby paradigm to reduce the impact of system failures from a service delivery perspective. These mechanisms usually rely on a dedicated HA-link between Active and Standby Systems to exchange keepalive messages. When for example, the keepalive mechanism fails, i.e., no keep alive message is received from the Active System in a timely manner by the Standby System, the Standby System assumes that the Active System is down and assumes the Active System role itself. In communications systems where Internet Protocol (IP) based communications are used, the Standby System usually has a dormant IP interface, which takes over the Media Access Control/Internet Protocol (MAC/IP) Address of the Active System after the switchover.

One problem with HA-link based keepalive systems is that the keepalive failure can result from a problem in the HA-link connectivity and actually the Active System may still be operational and in service. This situation is called a "split-brain" and results in two Active Systems. This split-brain result is very undesirable as it can cause errors and problems on peer systems from the application processing perspective. For example, both the Standby System (which switched to active status) and the Active System (which is still in the active status) receive/process messages sent in the context of the same application session and reply to them.

From the foregoing it is apparent that there is a need for a technological solution to how to effectively and efficiently reduce and/or eliminate and/or mitigate the effects of split brain scenarios in HA-systems. It is also desirable to reduce, eliminate and/or mitigate the effects of split brain occurrences in Internet Protocol based HA communications systems so as to reduce the impact of errors and problems when system failures occur especially when mission critical systems are involved.

SUMMARY

The present invention relates to communications methods and apparatus for reducing and/or eliminating split brain scenarios for High Availability (HA) systems and mitigating the effects of split brain occurrences in HA systems. Various embodiments of the present invention address and solve one or more of the technological problems discussed above. The present invention is applicable to and solves HA-communication system and Internet centric problems and errors introduced by spit brain scenarios.

An exemplary method embodiment of operating a high availability system including a cluster of processing nodes in accordance with the present invention includes the steps of: determining at a standby processing node that a failure condition exists, said standby processing node being one of the cluster of processing nodes; switching the standby processing node from a standby mode of operation to an active mode of operation in response to determining that a failure condition exists; and determining whether the high availability system is experiencing a split brain condition. The split brain condition is a condition wherein both the standby processing node and another processing node of the cluster of processing nodes are both operating at the same time in active mode operation.

In some embodiments, the step of determining at a standby processing node that a failure condition exists in the high availability system includes determining that heart beat signals sent from an active processing node of the cluster of processing nodes have not been received by the standby processing node during a predetermined period of time.

In some embodiments, the method further includes the step of monitoring, by the standby processing node while said standby processing node is in said standby mode of operation, a dedicated high availability link for heart beat signals being transmitted by said active processing node to said standby processing node.

In some embodiments, while the active processing node transmits heart beat signals to said standby processing node over the high availability link while in an active mode of operation, the active processing node does not transmit heartbeat messages over the dedicated high availability link when the active processing node stops operating in the active mode and switches to an inactive mode of operation or a standby mode of operation.

The high availability link may be, and typically is, a high speed link directly connecting the active processing node to said standby processing node such as for example a wired, e.g., copper, or a fiber optic link.

In some embodiments, the step of determining at a standby processing node that a failure condition exists includes determining that keep alive messages sent from the active processing node of the cluster of processing nodes have not been received by the standby processing node during a predetermined period time of time.

The standby processing node in some embodiments includes: (i) a dedicated high availability link communications interface which connects the standby processing node to said active processing node, (ii) a first Internet Protocol (IP) communications interface for communicating with external devices, said first IP communications interface having a first Medium Access Control (MAC) address and a first Internet Protocol address, and (iii) a second Internet Protocol (IP) communications interface dedicated for sending and receiving health check messages having a second MAC address and second IP address. In most embodiments, the second MAC address and second IP address are dedicated for use in sending and receiving health check probing signals/messages. In various embodiments, the active processing node includes: (i) a dedicated high availability link communications interface which connects the active processing node to said standby processing node, (ii) a first Internet Protocol (IP) communications interface for communicating with external devices, said first IP communications interface having the same Medium Access Control (MAC) address and Internet Protocol address as the first IP communications interface of the standby processing node, (iii) a second Internet Protocol (IP) communications interface dedicated for sending and receiving health check messages having a third MAC address and third IP address.

Various method embodiments of the present invention also include the step of maintaining, by said standby processing node, said first Internet Protocol (IP) communications interface having the first Medium Access Control (MAC) address and the first Internet Protocol address in a dormant state when said standby processing node is in said standby mode of operation. The standby processing node in such embodiments does not receive and/or send IP messages or IP packets, e.g., of IP messages, using the first Internet Protocol communications interface while in said standby mode.

In various method embodiments the step of switching the standby processing node from a standby mode of operation to an active mode of operation in response to determining that a failure condition exists includes switching said first Internet Protocol communications interface having the first MAC address and first IP address from a dormant state to an active state, said dormant state being a state in which the first IP communications interface does not receive or transmit messages using the first IP communications interface, said active state being a state in which the first IP communications interface receives and transmits messages using the first IP communications interface.

In some embodiments, the step of determining whether the high availability system is experiencing a split brain condition includes determining by the standby processing node whether the failure condition is a result of a failure of the active processing node. In some embodiments, the step of determining whether the high availability system is experiencing a split brain condition includes determining by the standby processing node whether the failure condition is a result of: (i) an active processing node failure or (ii) a high availability link failure or a standby processing node failure.

In various method embodiments, the method also includes the step of sending by the standby processing node a health check probing message to the active processing node using the second IP communications interface; and the step of determining by the standby processing node whether the failure condition is a result of a failure of the active processing node includes: determining by the standby processing node that the active processing node has not failed when the health check probing message sent to the active processing node has been successfully acknowledged by the active processing node. The health check probing message is in some embodiments a SIP Options message. The health check probing message is in some embodiments a HTTP Options message. In some embodiments wherein the health check probing message is a SIP Options message, the SIP Options message includes a signed time stamp value included as a parameter in the SIP Options message Via header.

In some such embodiments, the step of determining by the standby processing node that the active processing node has not failed when the health check probing message sent to the active processing node has been successfully acknowledged by the active processing node includes: determining that the health check probing message sent to the active processing node has been successfully acknowledged by the active processing node when the standby processing node receives a reply message from the active processing node in response to the SIP Options messages and said reply message includes said signed time stamp value. The standby processing node in most embodiments generates the signed time stamp value by encrypting a time stamp value corresponding to the time at which the SIP Options message was created.

In many such embodiments, the method includes the steps of: sending from the second communications IP interface of the standby processing node a health check probing message (e.g., SIP Options message with the signed time stamp value in Via header) to the active processing node second IP communications interface prior to said determining at a standby processing node that a failure condition exists; monitoring by the standby processing node for a response from the active processing node to the health check message on the second IP communications interface for a predetermined period of time (e.g., timeout period); and when no response message is received during the predetermined period of time storing in memory the time and an indication that the health check has failed due to a timeout; and when a response message is received by the standby processing node on the second IP communications interface from the active processing node in response to the health check message: (i) determining by the standby processing node whether said received response message is a successful acknowledgement of the health check message (e.g., determine that the response message includes the signed time stamp value in the Via header of the response message received in response to the SIP Options probing message), and (ii) storing in memory (e.g., cache) a time corresponding to when the response was received and the determination of whether the response was a successful acknowledgement or not.

The step of determining by the standby processing node whether the failure condition is a result of a failure of the active processing node may, and in some embodiments does, include determining by the standby processing node that the active processing node has not failed when the determination of whether the response was a successful acknowledgement or not stored in memory was that the response was a successful acknowledgement and that the time which has elapsed since the response was received (e.g., stored time value) is not greater than a configured threshold value (i.e., the response is not stale). Also the step of determining by the standby processing node whether the failure condition is a result of a failure of the active processing node may, and in some embodiments does, further include the step of sending from the second communications IP interface of the standby processing node a second health check probing message (e.g., SIP Options message with a signed time stamp value in the Via header) to the active processing node second IP communications interface after determining at the standby processing node that a failure condition exists and said response message to the health check message stored in memory was found to be equal to or greater than the configured threshold value (i.e., the response was stale); and determining that a failure of the active processing node exits when no response is received within a timeout period (e.g., a configured timeout period) to the second health check probing message or the response received is determined to not be a successful acknowledgement (e.g., the response does not include the signed time value in the response's Via header); and determining that the active processing node has not failed when a successful acknowledgement response message to the health check probing message is received prior to said timeout period.

In various method embodiments, the method further includes the step of determining by the standby processing node that the high availability system is experiencing a split brain condition when said standby processing node determines that the active processing node has not failed.

In some embodiments, the step of determining by the standby processing node whether the failure condition is a result of a failure of the active processing node further includes the steps of: sending one or more additional probing messages to one or more external devices when the standby processing node does not receive an acknowledgement message from the active processing node to the health check probing message sent to the active processing node, said one or more probing messages being sent using said second IP communications interface; determining that the active processing node has failed when the standby processing node receives an acknowledge to one or more of the additional probing messages sent to the one or more external devices; and determining that the active processing node has not failed when the standby processing node does not receive an acknowledge to any of the additional probing messages sent to the one or more external devices.

Various method embodiments further include the step of determining by the standby processing node that the high availability system is experiencing a split brain condition when said standby processing node determines that the active processing node has not failed. In some embodiments in response to determining that the high availability system is experiencing a split brain condition switching said standby processing node back to said standby mode of operation. Switching the standby processing node back to said standby mode of operation may, and typically does, include ceasing processing of messages received on the first IP communications interface of the standby processing device, and de-activating said first IP communication interface of the standby processing node wherein the first IP communications Interface is placed in the dormant state.

The processing nodes of the cluster may be, and in some embodiments are, servers, communications devices, or computing devices which include one or more processors, a memory, a high availability interface, a first communications interface which is a service interface that supports Internet Protocol messaging, a second communications interface which is a probing interface and also supports Internet Protocol messaging, and instructions included in the memory which when executed by the one or more processors control the operation of the processing node, e.g., to perform one or more steps of the method embodiments discussed herein.

In many, but not all embodiments, the cluster of processing nodes consists of an active processing node and a standby processing node.

The invention is also directed to systems and apparatus that are used to implement the various method embodiments of the invention.

While various embodiments have been discussed in the summary above, it should be appreciated that not necessarily all embodiments include the same features and some of the features described above are not necessary but can be desirable in some embodiments. Numerous additional features, embodiments and benefits of various embodiments are discussed in the detailed description which follows.

BRIEF DESCRIPTION OF THE DRAWINGS

FIG. 6 comprises FIGS. 6A and 6B.

FIG. 6A illustrates the first part of exemplary pseudocode for a High Availability system in accordance with one embodiment of the present invention.

FIG. 6B illustrates the second part of exemplary pseudocode for a High Availability system in accordance with one embodiment of the present invention.

FIG. 7 illustrates an exemplary health check probing message implemented as a Session Initiation Protocol (SIP) Options message.

FIG. 8 illustrates an exemplary health check probing response message implemented as a Session Initiation Protocol 200 OK response message to the SIP Options message illustrated in FIG. 7.

DETAILED DESCRIPTION

Figure 1:
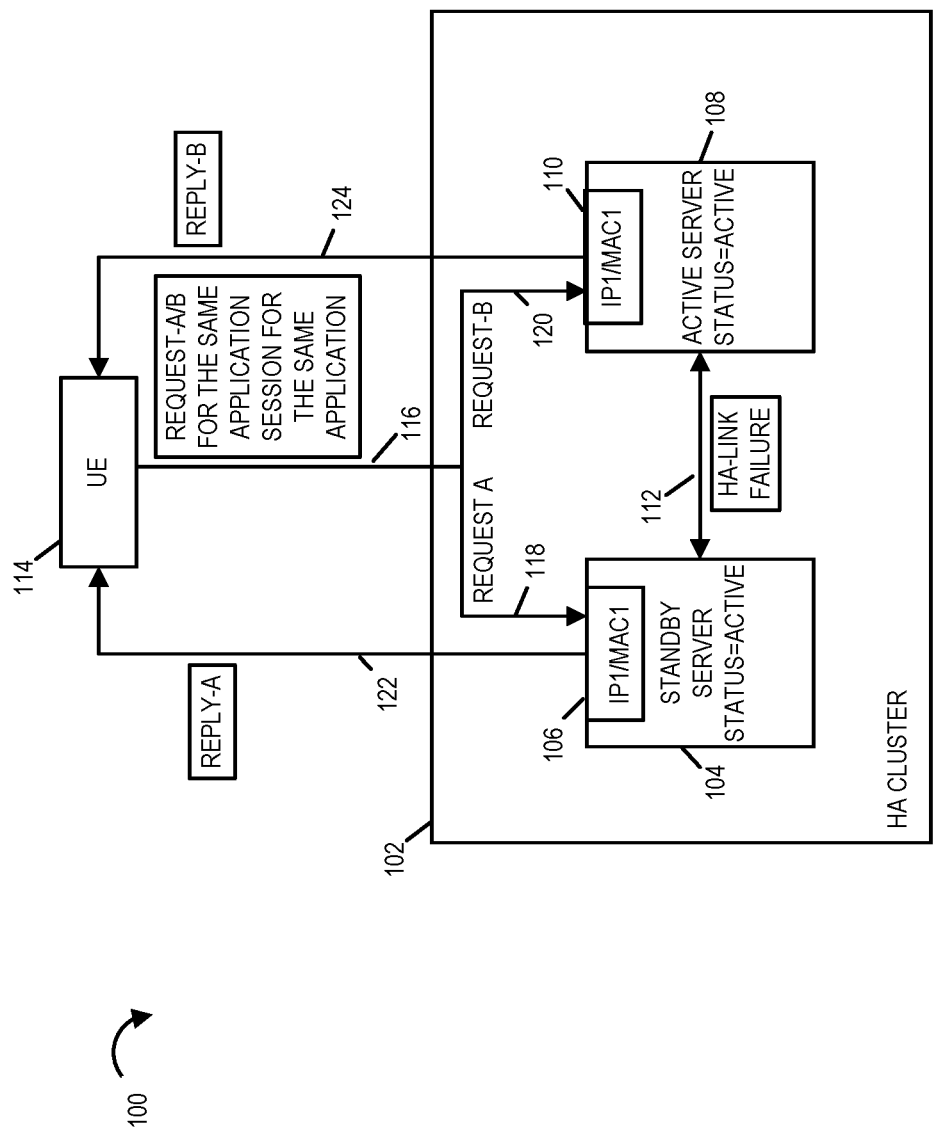
FIG. 1 illustrates a communications system with an exemplary High Availability System exhibiting split brain operation after a High Availability link failure.

FIG. 1 illustrates a communications system 100 with an exemplary High Availability System exhibiting split brain operation after a High Availability link failure. FIG. 1 illustrates a system 100 including a High Availability (HA) cluster 102 with a HA Pair deployment of a Standby Server System 104, an Active Server System 108, a user equipment device (UE) 114, and a high availability communications link 112 connecting the standby server system 104 and the active server system 108. Though not shown, one or more communications links, e.g., a communications network, couple the HA cluster 102 and its standby server 104 and active server 108 to the user equipment device 114. In the system 100, the HA-link 112 has experienced a failure. As a result of the failure of the HA-link 112 the standby server 104 status has become active and its network interface 106 has gone from a dormant state to an active state in which it uses the IP1/MAC1 Address. Because the failure was in the HA-link 112 and not the active server 108, the active server 108 continues to have the status of being active. At this time, the HA cluster 102 is experiencing the split brain problem in that both the standby server 104 and the active server 108 are operating as the server which is in the status=active, i.e. both the standby and active servers are in the active operating mode of service. The standby server 104 HA logic indicates that the active server is not operating in active mode/state of operation while the active server 108 HA logic indicates that the standby server 104 is not operating in the active mode/state of operation. Both the Input/Output (I/O) network interface 106 of the standby server 104 and I/O network interface 110 of the active server 108 are using the same IP MAC Address which is IP1/MAC1. The UE 114 includes a processor, memory, and I/O network interface which are not shown. The memory of the UE 114 includes software control routines and application software which when executed by the processor control the operation of the UE 114. FIG. 1 shows how the UE 114 sends a request 116 (Request-A/B 116) to the HA cluster 102 address IP1/MAC1. In this example, the request-A/B is for the same application session and for the same application, e.g., a voice over internet protocol (VOIP) session for a VOIP application being executed on the UE 114. As the request 116 is addressed to the IP1/MAC1 address which is being used by both the standby server 104 and the active server 108 it is received and processed by both the standby server 104 via I/O Interface 106 and the active server 108 via I/O Interface 110. The request A/B 116 is shown as being "split" into request A 118 received and processed by standby server 104 and request B 120 received and processed by active server 108. The request A 118 and request B 120 contain the same information as Request A/B 116. Standby server 104 in response to the request A 118 generates and sends reply-A 122 to UE 114. Active server 108 generates and sends reply-B 124 in response to the request B 120. Reply A 122 and Reply B 124 are both sent to UE 114 and are usually different thereby confusing and causing problems for UE 114 and the application being executed on UE 114 which sent the request 116. The High Availability cluster 102 is referred to as having a split brain because the standby server 104 and active server 108 have different data sets for the same session which is not synchronized and both are operating and responding to requests independently which results in different responses sent in reply to the same requests.

One approach to mitigating this split brain problem is to have additional redundancy checks through application layer protocol messaging, e.g., Session Initiation Protocol (SIP) OPTIONS, between Active/Standby instances and/or external services. However, this approach has a significant disadvantage in that the pinging/time out period for application layer checks cannot be very frequent as processing these message can be costly and would impact the actual application layer processing, e.g., processing of real time sessions for SIP, if the volume is too high. And, if the frequency is high, that prevents detection of failure conditions in a timely manner. As a result this approach is not often used in practice.

In a new approach a new dedicated interface is used for additional health-checking in addition to the HA-link. This dedicated interface has a MAC/IP address different than the one used for application level messaging for the cluster and its MAC/IP address is different on the Active and Standby Servers. It is always up regardless of the status of the server. For example, it would be always up for a Standby Server even when the Standby Server is operating in the standby mode of operation. This new dedicated interface is used by the Active/Standby servers to send health check probing messages, e.g., SIP OPTIONS probing messages, to each other and to external servers. For other application level protocols other than Session Initiation Protocol (SIP), a health check message suitable for probing in the context of the respective application protocol would be used. For example, in the case of the HyperText Transfer Protocol (HTTP) application level protocol, HTTP OPTIONS requests are used instead of SIP OPTIONS requests.

Figure 2:
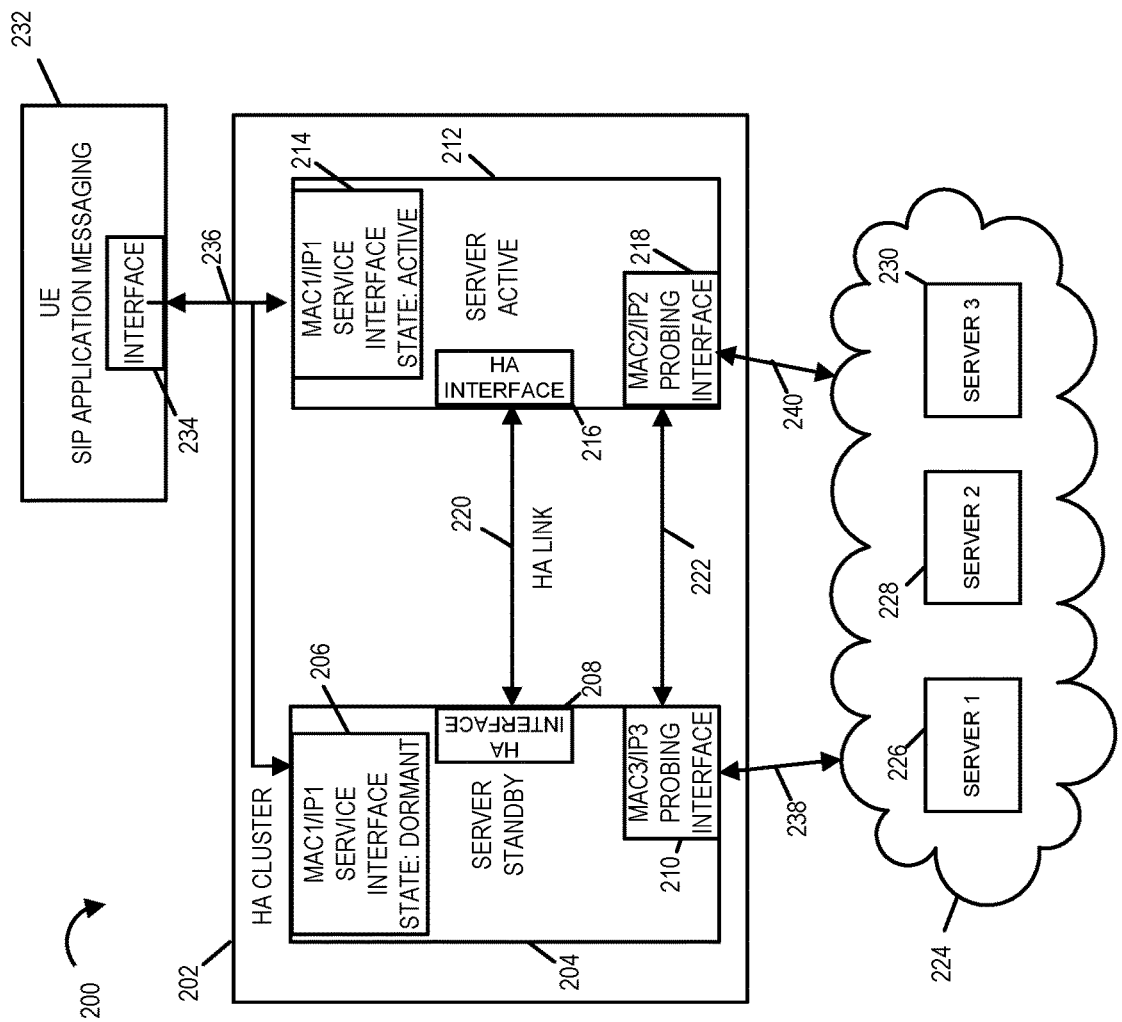
FIG. 2 illustrates an exemplary communications system including a High Availability-Pair Deployment System in accordance with one embodiment of the present invention.

FIG. 2 illustrates a communications system 200 in accordance with one embodiment of the present invention. System 200 includes a user equipment device (UE) 232, a High Availability System 202 also referred to as HA cluster, a communications network 224, e.g., Internet, server 1 226, server 2 228, server 3 230, and communications links 236, 238 and 240. The UE 232 includes an Input/Output (I/O) communications interface 234 via which IP messages can be transmitted and received. The HA system 202 includes a cluster of processing servers. The servers being computing devices or nodes. The cluster of processing servers including a standby server 204 and an active server 212. The standby server 204 including a High Availability (HA) interface 208, a first communications I/O interface 206 also referred to as a service interface which is shown as being in being in the dormant state, and a second I/O communications interface 210 referred to as probing interface having a Medium Access Control address (MAC3) and Internet Protocol address IP3. The active server 212 includes a first communications I/O interface 214 which is also referred to as a service interface 214 and which is shown as being in an active state, a HA interface 216 and a second communications I/O interface 218 which is referred to as a probing interface having a MAC2/IP2 address. The first interface 214 of the active server 212 has a MAC/IP address of IP1/MAC1. The first interface 206 of the standby server also has a MAC/IP address of MAC1/IP1 address and uses the MAC1/IP1 address when the standby server is in an active mode of operation and the first interface 206 of the standby server switches from a dormant state to active state wherein it receives, processes and transmits messages via the first interface 206. The HA interface 208 of the standby server 204 is connected or coupled to the HA interface 216 of the active server 212 via high availability link 220. The High Availability link 220 is a high speed communications link such as for example a wired, e.g., copper, or optical communications link. The HA link is used to exchange messages and responses, e.g., keep alive signals, heart beat signals and responses, between the standby server 204 and the active server 212. In most embodiments, the HA interfaces and communications link are a level 2 Open System Interconnection (OSI) model data link layer interface. In some embodiments, the standby and active servers communicate over the HA interfaces using a gossip protocol, e.g., as implemented in Serf cluster HA systems. The HA system also includes communications link 222 which couples or connects the second I/O communications interface 210 referred to as the probing interface of the standby server 204 to the second I/O communications interface 218 referred to as the probing interface of the active server 212. The standby server and active server exchange health check probing signals and/or messages, e.g., SIP Options messages and responses, over the communications link 222. Communications link 236 connects and/or couples the interface 234 of UE 232 to the high availability system standby server 204 first interface 206 and the active server 212 first interface 214 which are the service interfaces of the standby and active servers 204 and 212. The communications link 238 connects and/or couples the second I/O communications interface 210, the probing interface, of the standby server 204 to the communications network 224 and the server 1 226, server 2 228 and server 3 230 which are part of the communications network 224. The communications link 240 connects and/or couples the second I/O communications interface 218, the probing interface, of the active server 212 to the communications network 224 and the server 1 226, server 2 228 and server 3 230 which are part of the communications network 224. Server 1 226, Server 2 228 and Server 3 230 are sometimes referred to as external servers as they are external to the high availability system 202. The probing interfaces 210 and 218 of the standby server 204 and the active server 212 are dedicated to exchanging, e.g., sending and receiving health check probing messages which in this example are SIP Options messages and responses. The probing interfaces 210 and 218 have MAC/IP addresses which are different from each other and also from the service interfaces 206 and 212. The service interfaces 206 and 214 when in an active state have the MAC/IP address MAC1/IP1. The service interfaces 206 and 214 when in the active state are used to communicate with other devices, e.g., UE 232 and to provide services to other devices while the probing interfaces are dedicated to sending and responding to probing messages. The HA interfaces are private, e.g., proprietary, interfaces. The HA link is a private communications link only accessible to the servers of the HA system or cluster which in the example of high availability system 202 are standby server 204 and active server 212.

System 200 of FIG. 2 illustrates high availability system 202 in a state in which the active server 212 is operating in an active mode of operation and the standby server 204 is in a standby mode of operation. In the standby mode of operation the service interface 206 is in a dormant state and does not receive, process or respond to signals, messages, or packets. In the active mode of operation the service interface 214 receives, processes and responds to signals, messages, and packets, e.g., the SIP packets from the UE. In the example illustrated in FIG. 2, the active server 212 which is in the the active mode of operation is communicating with an application, e.g., a VOIP application being executed on a processor of the UE 232, using SIP application messaging. The high availability system may include, and in some embodiments does have, processing nodes and/or devices instead of servers. Each server of the high availability system includes one or more processors and memory, the memory including instructions which when executed by the one or more processors control the operation of the servers to perform one or more steps of the methods disclosed herein. Similarly, in the exemplary embodiment the server 1 226, server 2 228, and server 3 230 each include one or more processors and memory, the memory including instructions which when executed by the one or more processors control the operation of the server to perform one or more steps or operations attributed to the server in the methods described herein. The UE 232 includes one or more processors and memory, the memory including instructions which when executed by the one or more processors control the operation of the server to perform one or more steps or operations attributed to the UE in the methods described herein.

Figure 3:
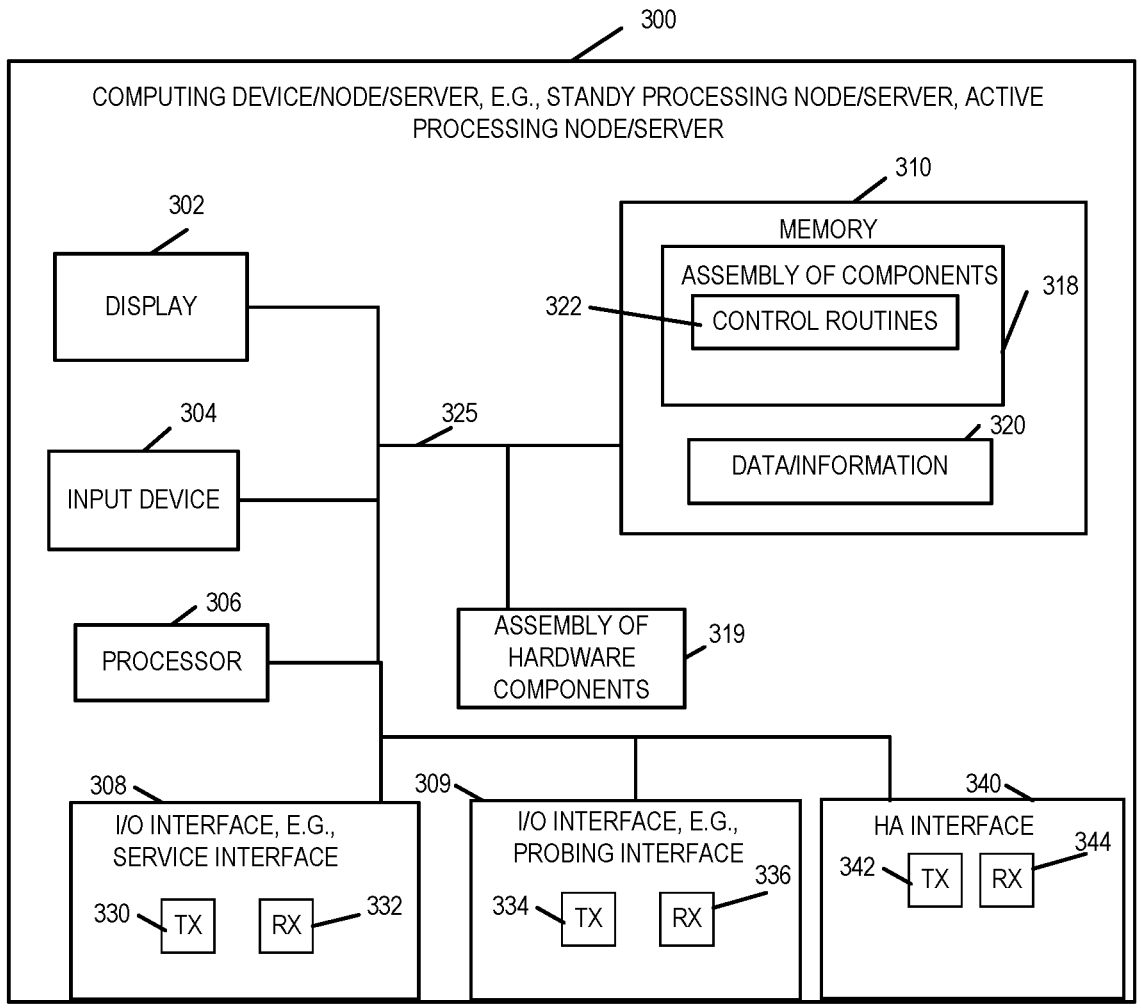
FIG. 3 illustrates an exemplary computing device/node/server in accordance with one embodiment of the present invention.

In some embodiments, one or more of the elements, nodes or components of the above mentioned systems are implemented in accordance with the exemplary computing device/node 300 illustrated in FIG. 3. The standby server 204 and active server 212 of the high availability system 202 may be, and in some embodiments are implemented in accordance with computing device/node 300.

Exemplary computing device/node 300 includes an optional display 302, an input device 304, a processor 306, e.g., a CPU, I/O interfaces 308 and 309, which couple the computing device/node 300 to networks or communications links and/or various other nodes/devices, high availability interface 340 that couples the computing device/node 300 to other computing devices/nodes, memory 310, and an assembly of hardware components 319, e.g., circuits corresponding to different components and/or modules, coupled together via a bus 325 over which the various elements may interchange data and information. Memory 310 includes an assembly of components 318, e.g., an assembly of software components, and data/information 320. The assembly of software components 318 includes a control routines component 322 which includes software instructions which when processed and executed by processor 306 control the operation of the computing device/node 300 to perform various functions and/or one or more steps of the various method embodiments of the invention. The I/O interface 308 includes transmitters 330 and receivers 332. The I/O interface 309 includes transmitters 334 and receivers 336. The high availability (HA) interface 340 includes transmitters 342 and receivers 344. The I/O interfaces and HA interface are hardware interfaces including hardware circuitry. The computing device/node 300 is also configured to have a plurality of Internet Protocol (IP) address/port number pairs, e.g., logical IP address/port pairs, for use in exchanging signaling information. In some embodiments the I/O interfaces include IP address/port pairs and a MAC address. The I/O interfaces in some embodiments are configured to communicate in accordance with the Internet Protocol (IP), Transport Control Protocol (TCP), and User Datagram Protocol (UDP). The HA interface in some embodiments is configured to communicate with a gospel protocol, e.g., protocol used with Serf. In some embodiments, the computing device/node 300 includes a communication component configured to operate using IP, TCP, UDP, Session Initiation Protocol. In some embodiments, the communications component is a hardware component, a software component or a component including hardware and software components. While only a single hardware processor is illustrated in some embodiments, it is to be understood that the computing device/node 300 can include more than one processor with the processing being distributed among the plurality of processors. In some embodiments, the I/O Interface 308 is a service interface. In some embodiments, the I/O interface 309 is a probing interface dedicated for use in exchanging health check probing signals/messages. In some embodiments, the HA interface includes circuitry for sending and receiving heart beat signals and detecting when heart beat signals are not received for another device or when heart beat signals are sent to another device are not acknowledged by the other device. In some embodiments, one or more of the following are implemented in accordance with the computing device/node 300 illustrated in FIG. 3: standby server 204, active server 212, server 1 226, server 2 228, server 3 230 and UE 232. When the server 1 226, server 2 228, server 3 230 and UE 232 are implemented in accordance with the computing device/node 300 they do not include the high availability link interface 340. While the UE 232 and the servers 226, 228 and 230 may, and in some embodiments do, include multiple I/O interfaces, they typically do not include a dedicated probing interface as the UE 232 is not involved in health check probing and the servers in cloud 224 can use there I/O interfaces for regular traffic in addition to responding to health check probing messages. In some embodiments however, one or more of the servers 1 226, 2 228, 3 230 do have an I/O interface dedicated to exchanging probing messages and/or signals so that there is no delay in responding to health check signals sent from servers of the high availability system.

Figure 4:
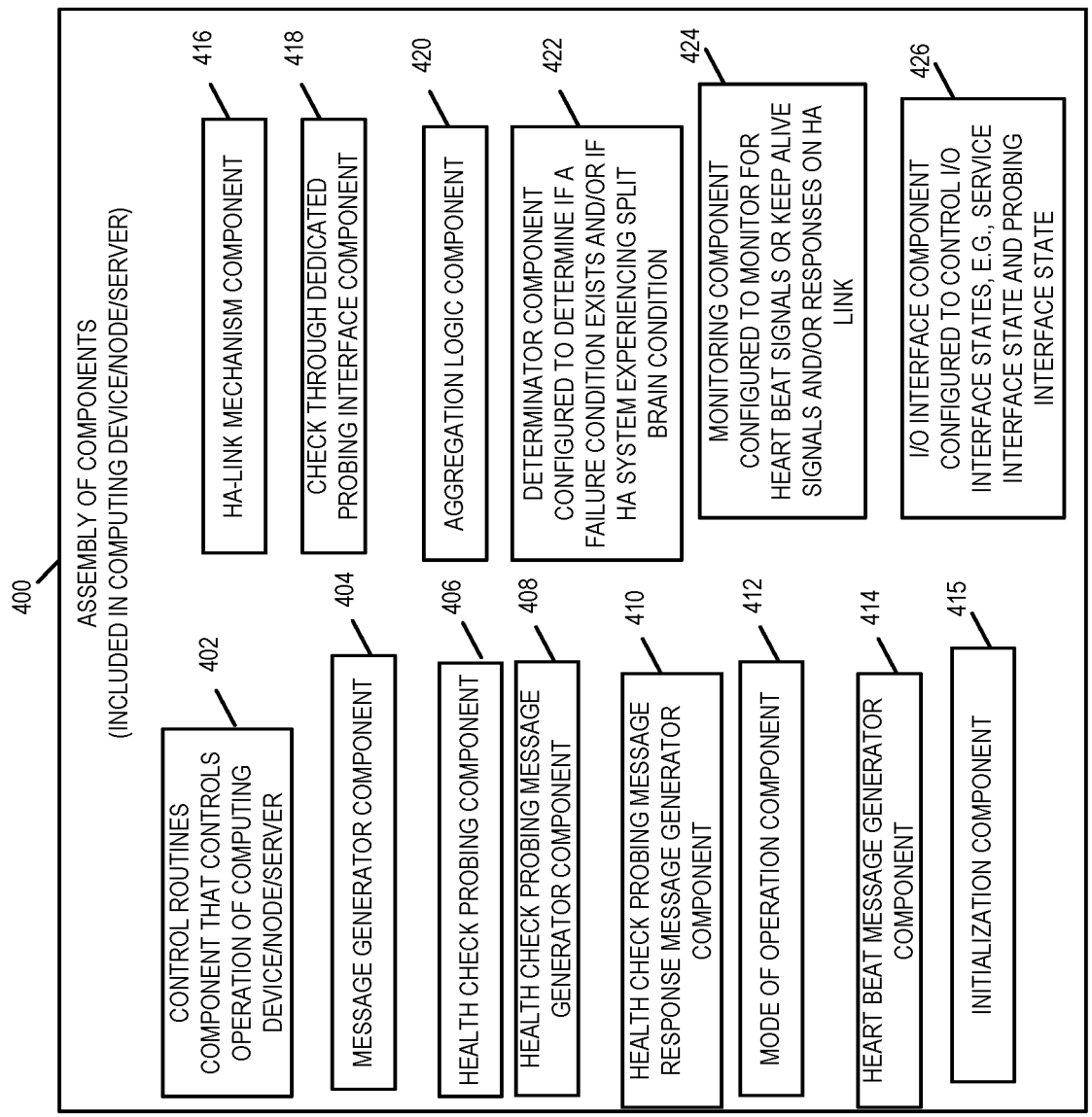
FIG. 4 illustrates an exemplary assembly of components which may be used in a computing device in accordance with one embodiment of the present invention.

FIG. 4 is a drawing of an exemplary assembly of components 400 which may be included in an exemplary computing device/node/server, e.g., exemplary standby server 204, active server 212, UE 232, or server 1 226, server 2 228, or server 3 230 of FIG. 2, in accordance with an exemplary embodiment. The specific components being included being based on the intended functionality of the device chosen. The components in the assembly of components 400 can, and in some embodiments are, implemented fully in hardware within a processor, e.g., processor 306, e.g., as individual circuits. The components in the assembly of components 400 can, and in some embodiments are, implemented fully in hardware within the assembly of hardware components 319, e.g., as individual circuits corresponding to the different components. In other embodiments some of the components are implemented, e.g., as circuits, within processor 306 with other components being implemented, e.g., as circuits within assembly of components 319, external to and coupled to the processor 306. As should be appreciated the level of integration of components on the processor and/or with some components being external to the processor may be one of design choice. Alternatively, rather than being implemented as circuits, all or some of the components may be implemented in software and stored in the memory 310 of the computing device 300, with the components controlling operation of computing device 300 to implement the functions corresponding to the components when the components are executed by a processor e.g., processor 306. In some such embodiments, the assembly of components 400 is included in the memory 310 as assembly of software components 318. In still other embodiments, various components in assembly of components 400 are implemented as a combination of hardware and software, e.g., with another circuit external to the processor providing input to the processor which then under software control operates to perform a portion of a component's function.

When implemented in software the components include code, which when executed by a processor, e.g., processor 306, configure the processor to implement the function corresponding to the component. In embodiments where the assembly of components 400 is stored in the memory 310, the memory 310 is a computer program product comprising a computer readable medium comprising code, e.g., individual code for each component, for causing at least one computer, e.g., processor 306, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 4 control and/or configure the computing device 400 or elements therein such as the processor 306, to perform the functions of corresponding steps illustrated and/or described in the method of one or more of the flowcharts, signaling diagrams and/or pseudocode described with respect to any of the Figures. Thus the assembly of components 400 includes various components that perform functions corresponding to one or more described and/or illustrated steps of an exemplary method.

Assembly of components 400 includes a control routines component 402, message generator component 404, health check probing component 406, a health check probing message generator component 408, a health check probing message response message generator component 410, a mode of operation component 412, a heart beat message generator component 414, an initialization component 415, a high availability link mechanism component 416, a check through dedicated probing interface component 418, an aggregation logic component 420, a determinator component 422 configured to make various determinations for the computing device/node/server including determining if a failure condition exists and/or if the HA system is experiencing a split brain condition, a monitoring component 424 configured to monitor for heart beat signals or keep alive signals and/or responses on a high availability link, and an Input/Output Interface Component 426 configured to control I/O interface states, e.g., service interface state of being active or dormant, probing interface state of being in active probing mode of operation or non-probing dormant mode of operation.

The control routines component 402 is configured to control operation of the computing device.

The message generator component 404 is configured to generate messages for transmission to other devices including requests, responses and instructions, e.g., health check probing messages, SIP probing messages and response messages, SIP Options probing messages and response messages, HTTP probing messages and response messages, heart beat signal messages, response to heart beat signal messages, keep alive messages and responses to keep alive messages, SIP application messages and response messages.

Figure 9A:
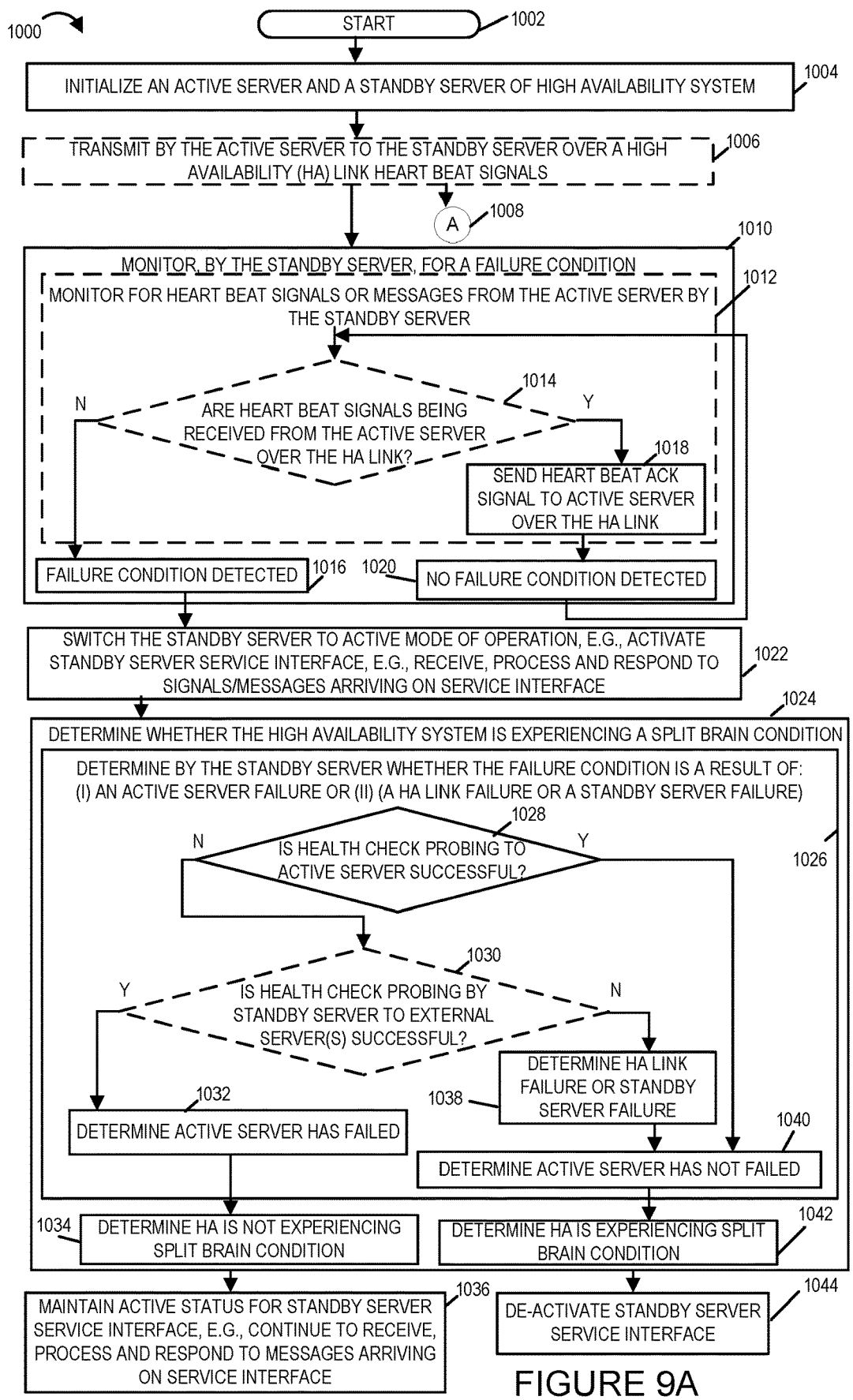
FIG. 9A illustrates the first part of a flowchart of a method in accordance with one embodiment of the present invention.
Figures 9, 9A, 9B:
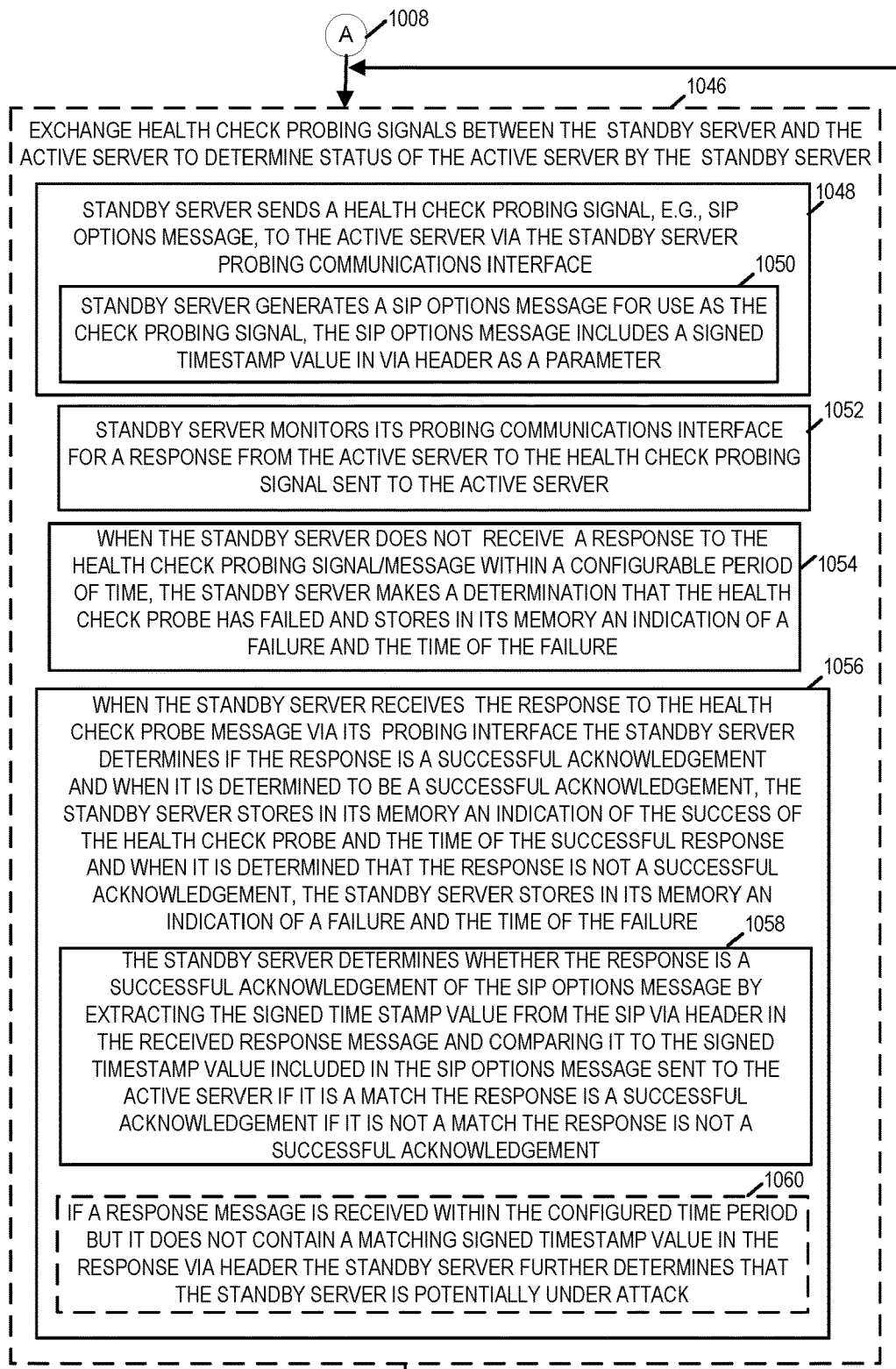
FIG. 9 comprises the combination of FIGS. 9A and 9B.
FIG. 9B illustrates the second part of a flowchart of a method in accordance with one embodiment of the present invention.

FIG. 9 comprises FIGS. 9A and 9B. FIG. 9A is a first part of a flowchart of an exemplary method 1000 in accordance with one embodiment of the present invention. FIG. 9B is a second part of a flowchart of an exemplary method in accordance with one embodiment of the present invention. For explanatory purposes the method 1000 will be explained in connection with the communications system 200 but it should be understand that the method 1000 is not limited to the communications system 200 and its exemplary high availability system 202 but may be used with other high availability systems or clusters of processing nodes or devices and other communications systems.

The exemplary method 1000 starts in start step 1002. Operation proceeds from start step 1002 to step 1004.

In step 1004, a high availability system is initialized, e.g., high availability system 202. The high availability system includes a plurality of servers including an active server, e.g., active server 212 and a standby server, e.g., a standby server 204. The active server is initialized so that it is in an active mode or state of operation and the standby server is initialized so that it is in a standby mode or state of operation. The standby server which is in the standby mode of operation includes a service interface, e.g., standby service interface 206, which is in a dormant state. When in the dormant state the service interface, e.g., service interface 206, does not receive, process, reply to, or transmit signals, messages, or packets, e.g., Internet Protocol packets which are part of an IP packet stream. The active server which is in an active mode of operation has a service interface which is in an active state and which does receive, process, reply to, and transmit signals, messages, and packets, e.g., Session Initiation Protocol messages, and Internet Protocol packets which are part of an IP packet stream. Operation proceeds from the initialization step 1004 to optional step 1006.

In step 1006, the active server transmits heart beat signals or keep alive signals over a high availability link, e.g., high availability link 202, connecting the active server 212 to the standby server 204. The heart beat signals or keep alive signals are transmitted from a transmitter included in high availability interface, e.g., HA interface 216, of the active server, e.g., active server 212. Operation proceeds from step 1006 to step 1010 and via connection node A 1008 to optional step 1046 shown on FIG. 9B.

In optional step 1046, health check probing signals, e.g., SIP Options probing messages and response messages, are exchanged between the standby server and the active server to determine the status of the active server by the standby server. In the exemplary high availability system 202, and the active server 212 has a communications interface 218 with a MAC2/IP2 address and the standby server 204 has a communications interface 210 with a MAC3/IP3 address. The communications interface 218 and 210 are probing communication interfaces as they are used to send and receive health check probing signals/messages. In most embodiments, these probing interfaces 210 and 218 are dedicated to sending and receiving health check probing signals, e.g., SIP Options messages and responses. This is done so that the health check signals/messages do not interfere with the traffic being serviced by the high availability system, e.g., SIP applications messages being received from external systems/devices such as for example UE 232 and so that the traffic being serviced also does not interfere with the health checking signals. In some embodiments, optional step 1046 includes one or more sub-steps 1048, 1052, 1054, and 1056.

In sub-step 1048, the standby server sends a health check probing signal, e.g., SIP Options message to the active server via the standby server's probing communication interface. Sub-step 1048 in some embodiments includes sub-step 1050. In sub-step 1050, the standby server generates a SIP Options messages for use as the health check probing signal, the SIP Options message includes a signed timestamp value generated by the standby server and signed (e.g., encrypted) by the standby server. The signed timestamp value being included in the Via header of the SIP Options messages. Diagram 700 of FIG. 7 illustrates an exemplary SIP Options message 704 and a title box 702 which describes the SIP Options message 704 but is not part of the SIP Options message 704. The diagram 700 illustrates an exemplary SIP Options message 704 used as a health check probing message in accordance with one embodiment of the present invention. The health check signals or messages are application level protocol messages as opposed to the heart beat signals. While the Session Initiation Protocol messages and in particular SIP Options messages have been described in the exemplary embodiment other application level protocols may be used for the health check messages such as for example the HTTP protocol wherein HTTP Options requests and responses can be used instead of SIP Options messages and responses. The timestamp value in the exemplary SIP Options message 704 shown in FIG. 7 has the value "zJ6F1VOgFWSjHBr8Qjpjlk". The timestamp value is encrypted and hence is not human-readable and is protected against tampering. If it is altered the timestamp in the response message or reply won't successfully pass the security validation as will be discussed in further detail below.

In sub-step 1052, the standby server monitors its probing communications interface, e.g., probing interface 210, for a response from the active server to the health check probing signal sent to the active server.

In sub-step 1054 when the standby server does not receive a response to the health check probing signal/message sent to the active server within a configurable period of time, the standby server makes a determination that the health check probe has failed and stores in its memory an indication of a failure and the time of the failure. The configurable time period is a timeout period wherein if a response is not receive within the timeout period it is determined that health check has failed. The timeout period also referred to as a configurable time period in some embodiments is based at least in part on the round trip time determined for a message to travel from the standby server to the active server and back to the active server. The timeout period being set or configured to a value which is greater than the measured or determined round trip time. While the communications link 222 connecting the standby server and the active server probing interfaces is shown as an internal communications link of the high availability system the communications link 222 may, and in some embodiments does, comprise a plurality of external communications network links that traverse private and/or public communications networks.

In sub-step 1056, when the standby server receives the response to the health check probe message via its probing interface, e.g., probing interface 210, the standby server determines if the response is a successful acknowledgement. When the standby server determines that the response is a successful acknowledgement the standby server stores in its memory an indication of the success of the health check probe and the time of the successful response. When the standby server determines that the response is not a successful acknowledgement, the standby server stores in its memory an indication of a failure of the heath check probe and the time of the failure of the health check probe. The store of the success or failure of the health check probe in memory makes it available for future reference when the standby server detects a failure condition, e.g., in connection with the heart beat or keep alive signals being sent from the active server to the standby server. In some embodiments when the health check signal is a SIP Options messages including a signed timestamp value in its Via header, sub-step 1056 includes sub-step 1058. In sub-step 1058, the standby server determines whether the received response is a successful acknowledgement of the SIP Options message by extracting a timestamp value from the via header of the received response message and comparing it to the signed timestamp value included in the SIP Options message sent to the active server. If the received timestamp value matches the signed timestamp value included in the SIP Options message Via header the standby server determines that the response is a successful acknowledgement. If the received timestamp value does not match the signed timestamp value included in the SIP Options message Via header the standby server determines that the response is not a successful acknowledgement. In some embodiments, when there is a successful match of the received timestamp value and the signed timestamp value, the standby server performs an additional check before determining that the response is a successful acknowledgement. In one embodiment, the additional check performed is that the standby server validates the timestamp in the received response based on a secret key and then also checks the amount of time that has passed since the timestamp was generated. If the amount of time that has passed since the timestamp was generated is greater than a configured amount of time the standby server determines that the response has not been successfully acknowledged. In some embodiments, in the instances in which the standby server receives responses but the responses are determined not to be a successful acknowledgement of the SIP Options message either because the signed timestamp value does not match or because its matches but the amount of time since it was generated is greater than the configured amount of time, e.g., a time window such as 10 seconds, the standby server in optional step 1060 determines that the responses are suspicious and may be indicative of an attack on the standby server, e.g., a replay attack wherein a device is sending old messages which have been intercepted to the intended endpoint device. The standby server after determining that it may be or potentially is under attack sends a notification to a management entity for indicating the possibility of an attack and/or takes actions to mitigate such an attack. Diagram 800 of FIG. 8 illustrates a SIP 200 Ok response message 804 which may be sent by the active server to the standby server in response to the SIP Options message 704 illustrated in FIG. 7 that would be determined as a successful acknowledgement as it contains the signed timestamp value "zJ6F1VOgFWSjHBr8Qjpjlk" in its via header. Diagram 800 also includes a title box 802 which is a description of the SIP response message 804 but is not part of the SIP response message. Operation proceeds from step 1046 back to the start of step 1046 where the exchange of health check probing signals between the standby server and the active server continue. The exchange of messages go on in parallel or concurrently with the monitoring step 1010 and remaining steps of the method.

Returning to step 1010, in step 1010 the standby server monitors for a failure condition. In some embodiments, step 1010 includes sub-step 1012, 1016 and 1020. In sub-step 1012 the standby server monitors for heart beat signals or messages or keep alive signals or messages from the active server. In decision sub-step 1014 of step 1012 if the heart beat signals or messages or keep alive signals or messages are being received from the active server over the HA link, e.g., HA link 220 of system 200, then operation proceeds to sub-step 1018. In sub-step 1018, the standby server sends acknowledgements to the active server that it received the heart beat signals/messages or keep alive signals/messages. Operation proceeds from step 1018 to sub-step 1020 in which the standby server determines that no failure condition exists. Operation proceeds from step 1020 back to step 1014 as the monitoring for received signals continues. In sub-step 1014 when heart beat signals/messages or keep alive signals/messages are not received from the active server over the HA link operation proceeds to sub-step 1016. In sub-step 1016, the standby server makes a determination that a failure condition exists and operation proceeds from sub-step 1016 of step 1010 to step 1022. In step 1010, monitoring for a failure condition exists until a failure condition is detected at which point operation proceeds from the monitoring step 1010 to the step 1022.

In step 1022, the standby server switches from a standby mode of operation to an active mode of operation. This includes switching the standby server's service interface, e.g., service interface 206, from a dormant state to an active state in which it assumes the MAC1/IP1 address and receives, processes, and responds to signals/messages arriving on the service interface as well as transmits from the service interface. Operation proceeds from step 1022 to step 1024.

In step 1024, the standby server determines whether the high availability system, e.g., HA system 202, is experiencing a split brain condition. A split brain condition being a condition wherein both the standby processing server and the active processing server are both operating at the same time in active mode operation. Step 1024 may, and in some embodiments does, include one or more sub-steps 1026, 1034 and 1042.

In sub-step 1026, the standby server determines whether the failure condition is a result of: (i) an active server failure or (ii) a HA link failure or a standby server failure. In some embodiments sub-step 1026 includes one or more of sub-steps 1028, 1030, 1032, 1038 and 1040. In decision sub-step 1028, the standby server determines whether health check probing to the active server is successful. If health check probing to the active server is successful then operation proceeds to sub-step 1040 in which the standby server determines that the active server has not failed. If the health check probing to the active server is not successful operation proceeds from sub-step 1028 to optional sub-step 1030. If optional sub-step 1030 is not implemented operation proceeds to sub-step 1032. In some embodiments, the standby server determines whether the health check probing is successful in step 1028 by first checking in memory for an indication of a successful acknowledgement or a failure of a health check probe signal/message sent by the standby server to the active server prior to the determination of the failure condition in step 1010. Such an indication would be stored in memory in step 1046 along with the time of the determination on whether the health check probe was successful or not. Upon retrieving from memory the last indication of a success or failure of a health check probe by the standby server and its corresponding time, the standby server determines if the retrieved information is stale, i.e., is the lapsed time since the time stored in memory greater than a configurable time value that is used to test whether the information on the success or failure of a health check probe to the active server is stale. If the information retrieved from memory is not stale then it is used to determine if the health check probing to the active server is successful. In such a case if the information retrieved from memory indicates that the last health check probe was successful then the standby server determines that the health check probing to the active server is successful and if the information retrieved from memory indicates that the last health check probe was not successful then the standby server determines that the health check probing to the active server is not successful. When the standby server determines that the information stored in its memory is stale then the standby server implements a health check probe of the active system as described in method step 1046. In some embodiments, instead of sending a new health check probe signal/message to the active server, the standby server may determine that a health check probe signal/message has already been sent to the active server and the standby server will utilize the response or lack of response to the outstanding health check probe signal by the active server to make the determination as to whether the health check probing to the active server is successful. In this way, the determination can be made quicker as the standby server does not have to generate and send a health check probe signal/message and wait the full time for the response to be received or the configured time period, e.g., timeout, to occur before receiving information on which the determination can be made.

In optional decision sub-step 1030, the standby server determines whether the health check probing by the standby server to one or more external server(s), e.g., server 1 226, server 2 228 and/or server 3 230 of system 200, is successful. Health check probing by the standby server to one or more external server(s) includes in some embodiments sending a health check signal or message, e.g., SIP Options message, to an external server via the standby probing interface, e.g., probing interface 210, and determining if a successful acknowledgement of the health check signal is received within a configured period of time. Step 1048 may be, and in some embodiments is, used to perform the health check probing to the one or more external server(s) wherein the external server replaces the active server in step 1048. In sub-step 1030, when the health check probing to the external server(s) is successful operation proceeds from sub-step 1030 to sub-step 1032 wherein the standby server determines that there is an active server failure. However, if in sub-step 1030 the health check probing by the standby server to the external server(s) is not successful then operation proceeds from sub-step 1030 to sub-step 1038 wherein the standby server determines that there is a HA link failure or standby server failure. Operation proceeds from sub-step 1038 to sub-step 1040 of sub-step 1026. In sub-step 1040, the standby server determines that there has not been an active server failure. Operation proceeds from sub-step 1040 of step 1026 to sub-step 1042 of step 1024. In sub-step 1042, the standby server determines that the high availability system is experiencing a split brain condition as the active server did not fail and therefore is operating in the active mode of operation and the standby server is also now in the active mode of operation with its service interface in the active state. Operation proceeds from sub-step 1042 of step 1024 to step 1044 in which the standby server switches back to a standby mode and de-actives the standby server service interface, e.g., service interface 206, by placing it in a dormant state. In some embodiments in which the standby server is experiencing the failure, the standby server takes whatever operations it can to de-activate the standby server's service interface and also log the condition in memory and/or notify an external management server and/or active server that it is experiencing a failure or the high availability link is experiencing a failure. In some embodiments when the health checking probing in step 1028 is successful and the standby server determines the HA system is experiencing a split brain condition, the standby server logs the problem in memory and/or notifies an external management server and/or the active server of the problem and the current state of the standby server. When an external management server receives such a notification it may initiate tests and/or operations to help identify and/or alleviate the cause of the failure that led to the split brain condition.

Operation proceeds from sub-step 1032 of sub-step 1026 to sub-step 1034 in which the standby server determines that the high availability system is not experiencing a split brain condition. This is so because the active server has failed and therefore the only server in an active mode of operation is the standby server. Operation proceeds from sub-step 1034 of step 1024 to step 1036.

In step 1036, the standby server maintains operating in the active mode of operation and maintains active status for the standby server service interface, e.g., continues to receive, process, and respond to messages arriving on the service interface 206, e.g., receiving, processing, and responding to SIP application messages, e.g., VOIP messages, from UE 232.

In some embodiments of the method 1000, the standby server determines whether switching to the active mode of operation will result in a high availability system split brain condition before switching to active mode. And, if the standby server determines that switching to active mode of operation will result in a split brain condition, the standby server refrains from switching to the active mode of operation. In such an embodiment, the checks performed in step 1026 are performed and if it is determined that the an active server failure has occurred then the standby server determines that a split brain condition will not exist if it switches to an active mode of operation and then switches to an active mode of operation. However if checks performed determine that there is an HA link failure or a standby system failure, the standby server determines that a split brain condition will exist if it switches to an active mode of operation and refrains from switching to an active mode of operation. In these embodiments, the health check probes are used to prevent the high availability system from entering into a split brain condition. However, this solution in some cases delays the high availability system's response to active server failures and as the split brain condition is only a small portion of the failures it is typically used when the timing of the response of the switchover can accommodate the additional time to complete the health check probing.

In some embodiments of the method 1000, the standby server first checks whether a successfully acknowledgement or a timeout has occurred with respect to a prior SIP health check probe signal/message sent to the active server within a preconfigured time period and uses the results of that SIP health check probe to determine whether to switch into active mode or refrain from switching into active mode. In some such embodiments, if the standby servers determines that no SIP health check probe signal/message was sent and received with the preconfigured time period, i.e., the available SIP health check probe information is stale or out of date, the standby server switches to active mode of operation and then waits for the results of the next SIP health check probe to determine whether the high availability system is experiencing a split brain condition. In such embodiments, the high availability system eliminates at least some high availability system split brain occurrences while minimizing the delay time to respond to actual active server failures and also minimizing the effects of split brain high availability systems experiences by quickly identifying that the high availability system is experiencing a split brain condition and eliminating the split brain condition by switching the standby server back to a standby mode of operation in which the standby server's service interface is de-activated and returned to a dormant state of operation.

In some embodiments, after a failure condition is detected in step 1012, the standby server switches from a standby server state to a partial operational state in which the standby server activates its service interface and begins processing incoming messages received on the service interface while also performing health check probing to the active server. During this partial operational state of operation, the standby server does not respond to any incoming messages or send out any commands. Once the health check probing is completed the standby server then either switches to an active mode of operation or back to the standby mode of operation depending on whether the health check probing results indicated that the an active server failure has occurred or that there has been a HA link failure or a standby server failure as previously described. In this embodiment, the split brain condition is avoided and at least some processing has occurred since the failure condition was detected so as to minimize the impact of the potential disruption to service of communications devices interacting with the high availability system.

Because the health check probing, e.g., SIP message probing, is performed at the application level and requires additional time for the communication and processing of health check probing messages, the frequency of how often health check probes are sent or exchanged in step 1046 is typically determined based on the processing capability of the standby and active servers, the round trip time of communications from the standby server to the active server over the communications link 222 and the potential impact on the ability of the active server to perform its normal operations, e.g., receiving and servicing requests received on its service interface. Various embodiments of the present invention eliminate and/or reduce the effects of split brain conditions on high availability systems in an inexpensive manner as the additional cost of an extra probing communications interface is far cheaper than the use of an additional high availability communications link.

In some embodiments, the standby server sends health check probing messages to one or more external severs prior to detecting a failure condition so that when a failure condition is detected information is available on the status of the health of the standby server. In some embodiments, an additional step is performed in parallel with step 1046 in which the standby server exchanges health check probing signals between the standby server and one or more external servers or communications devices to determine the status of the standby server similar to the method steps employed in step 1046 in connection with the exchange of health check probing signals between the standby server and the active server which is used to determine the status of the active server.

In some embodiments, the high availability system includes a cluster of servers in which a single server acts as the standby server for a plurality of active servers and sends health check probing signals to each of the active servers for which it is acting as a standby server.

FIG. 6 comprises FIGS. 6A and 6B. Diagram 600 of FIG. 6A illustrates the first part of exemplary pseudocode for use in a standby server or an active server in a High Availability system in accordance with one embodiment of the present invention. Diagram 602 of FIG. 6B illustrates the second part of exemplary pseudocode for use in a standby server or an active server in a High Availability system in accordance with one embodiment of the present invention. Diagram 600 includes line numbers 6000, 6010, 6020, 6030, 6040, 6050, 6060, 6070, 6080, 6090, 6200, 6210, 6220, 6230, 6240, 6250, 6260, 6270, 6280, 6290, 6300, 6310, 6320, 6330, 6340, 6350, 6360, 6370, 6380 for reference purposes. Diagram 602 includes line numbers 6390, 6400, 6410, 6420, 6430, 6440, 6450, 6460, 6470, 6480, 6490, 6500, 6510, 6520, 6530, 6540, 6550, 6560, and 6570 for reference purposes.

Figure 5:
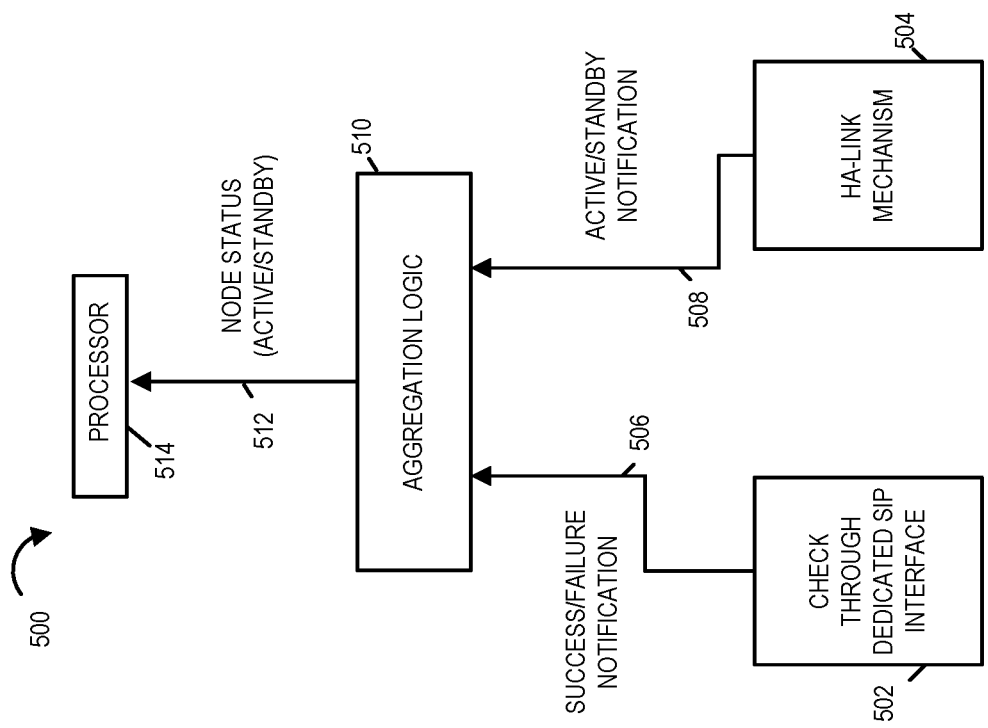
FIG. 5 illustrates exemplary logic and signaling for use in an active or standby processing node or server of a high availability system.

Diagram 500 of FIG. 5 illustrates exemplary logic and signaling for use in an active or standby processing node or server of a high availability system. In FIG. 5, the check through dedicated SIP interface 502 is logic that may be implemented as a software or hardware component that performs SIP probing checks. It is typically utilized by the standby processing node or server to perform health checks on the active server or processing node and/or the standby server itself and make determinations as to whether (1) an active server/processing node has experienced a failure or (2) a failure has occurred on the HA link or standby server/processing node. The check through dedicated SIP Interface, e.g., probing interface of standby server/processing node, outputs a notification signal/message to the aggregation logic 510 informing the aggregation logic 510 of the success or failure of the check performed through the dedicated SIP interface 502. The HA link mechanism may, and sometimes is, implemented as a software or hardware component. The HA link mechanism sends and receives heart beat signals and monitors for the failure of heart beat signals or responses to heart beat signals. The HA-Link mechanism also determines the active/standby state of the device based on whether the monitored device has failed to send heart beat signals or respond to heart beat signals which it was sent. The HA-Link device will switch a server/processing node that is in the standby operational mode or state into an active operational mode or state upon detection of failure of the heart beat from the active server/processing node. The HA-link mechanism 504 sends an active/standby notification signal/message 508 to the aggregation logic indicating the state of operation the server/node is in based on the monitored signals being received over the HA link.

The aggregation logic 510 may be, and in some embodiments is, implemented as a software or hardware component. The aggregation logic receives the success/failure notification 506 from the check through dedicated SIP interface 502 and the active/standby notification 508 from the HA-link mechanism and based on these signals determines whether the HA system is experiencing a split brain condition and the status the server/processing node should be placed in so that the split brain condition is avoided or terminated. The aggregation logic determines the proper state of the server/processing node and sends node status (active/standby) 512 to the processor 514 of the server/processing node so that the processor can control the server/processing node to place it in the mode/status of operation specified by the aggregation logic in the node status signal 512.

LIST OF A SET OF EXEMPLARY NUMBERED METHOD EMBODIMENTS

Method Embodiment 1. A method of operating a high availability system including a cluster of processing nodes comprising: determining at a standby processing node that a failure condition exists, said standby processing node being one of the cluster of processing nodes; switching the standby processing node from a standby mode of operation to an active mode of operation in response to determining that a failure condition exists; and determining whether the high availability system is experiencing a split brain condition.

Method Embodiment 2. The method of method embodiment 1, wherein said split brain condition is a condition wherein both the standby processing node and another processing node of the cluster of processing nodes are both operating at the same time in active mode operation.

Method Embodiment 3. The method of method embodiment 1 wherein said determining at a standby processing node that a failure condition exists includes determining that heart beat signals sent from an active processing node of the cluster of processing nodes have not been received by the standby processing node during a predetermined period of time.

Method Embodiment 4. The method of method embodiment 3 further comprising: monitoring, by the standby processing node while said standby processing node is in said standby mode of operation, a dedicated high availability link for heart beat signals being transmitted by said active processing node to said standby processing node.

Method Embodiment 5. The method of method embodiment 4 where said active processing node does not transmit heartbeat messages over the dedicated high availability link when the active processing node stops operating in the active mode and switches to an inactive mode of operation or a standby mode of operation.

Method Embodiment 6. The method of method embodiment 4 wherein said high availability link is a high speed link directly connecting the active processing node to said standby processing node.

Method Embodiment 7. The method of method embodiment 6 wherein said high availability link is a wired link or a fiber optic link.

Method Embodiment 8. The method of method embodiment 4 wherein said active processing node transmits said heart signals to said standby processing node over said high availability link while in an active mode of operation.

Method Embodiment 9. The method of method embodiment 1 wherein said determining at a standby processing node that a failure condition exists includes determining that keep alive messages sent from the active processing node of the cluster of processing nodes have not been received by the standby processing node during a predetermined period of time.

Method Embodiment 10. The method of method embodiment 9 wherein said standby processing node includes: (i) a dedicated high availability link communications interface which connects the standby processing node to said active processing node, (ii) a first Internet Protocol (IP) communications interface for communicating with external devices, said first IP communications interface having a first Medium Access Control (MAC) address and a first Internet Protocol address, and (iii) a second Internet Protocol (IP) communications interface dedicated for sending and receiving health check messages having a second MAC address and second IP address.

Method Embodiment 11. The method of method embodiment 10 wherein said active processing node includes: (i) a dedicated high availability link communications interface which connects the active processing node to said standby processing node, (ii) a first Internet Protocol (IP) communications interface for communicating with external devices, said first IP communications interface having the same Medium Access Control (MAC) address and Internet Protocol address as the first IP communications interface of the standby processing node, (iii) a second Internet Protocol (IP) communications interface dedicated for sending and receiving health check messages having a third MAC address and third IP address.

Method Embodiment 12. The method of method embodiment 10, further comprising: maintaining, by said standby processing node, said first Internet Protocol (IP) communications interface having the first Medium Access Control (MAC) address and the first Internet Protocol address in a dormant state when said standby processing node is in said standby mode of operation.

Method Embodiment 13. The method of method embodiment 12, wherein said standby processing node does not receive and/or send IP messages or IP packets, e.g., of IP messages, using the first Internet Protocol communications interface while in said standby mode.

Method Embodiment 14. The method of method embodiment 12 wherein switching the standby processing node from a standby mode of operation to an active mode of operation in response to determining that a failure condition exists includes switching said first Internet Protocol communications interface having the first MAC address and first IP address from a dormant state to an active state, said dormant state being a state in which the first IP communications interface does not receive or transmit message using the first IP communications interface, said active state being a state in which the first IP communications interface receives and transmits messages using the first IP communications interface.

Method Embodiment 15. The method of method embodiment 14 wherein determining whether the high availability system is experiencing a split brain condition includes determining by the standby processing node whether the failure condition is a result of a failure of the active processing node.

Method Embodiment 16. The method of method embodiment 14 wherein determining whether the high availability system is experiencing a split brain condition includes determining by the standby processing node whether the failure condition is a result of: (i) an active processing node failure or (ii) a high availability link failure or a standby processing node failure.

Method Embodiment 17. The method of method embodiment 15 further comprising: sending by the standby processing node a health check probing message to the active processing node using the second IP communications interface; and wherein said determining by the standby processing node whether the failure condition is a result of a failure of the active processing node includes: determining by the standby processing node that the active processing node has not failed when the health check probing message sent to the active processing node has been successfully acknowledged by the active processing node.

Method Embodiment 18. The method of method embodiment 17 wherein the health check probing message is a SIP Options message.

Method Embodiment 19. The method of method embodiment 18 wherein the SIP Options message includes a signed time stamp value included as a parameter in the SIP Options message Via header.

Method Embodiment 20. The method of method embodiment 19 wherein said determining by the standby processing node that the active processing node has not failed when the health check probing message sent to the active processing node has been successfully acknowledged by the active processing node includes: determining that the health check probing message sent to the active processing node has been successfully acknowledged by the active processing node when the standby processing node receives a reply message from the active processing node in response to the SIP Options messages and said reply message includes said signed time stamp value.

Method Embodiment 21. The method of method embodiment 20 further comprising: generating by the standby processing node said signed time stamp value by encrypting a time stamp value corresponding to time at which the SIP Options message was created.

Method Embodiment 22. The method of method embodiment 15 further comprising: sending from the second communications IP interface of the standby processing node a health check probing message (e.g., SIP Options message with signed time stamp value in Via header) to the active processing node second IP communications interface prior to said determining at a standby processing node that a failure condition exists; monitoring by the standby processing node for a response from the active processing node to the health check message on the second IP communications interface for a predetermined period of time (e.g., timeout period); when no response message is received during the predetermined period of time storing in memory the time and an indication that the health check has failed due to a timeout; when a response message is received by the standby processing node on the second IP communications interface from the active processing node in response to the health check message: (i) determining by the standby processing node whether said received response message is a successful acknowledgement of the health check message (e.g., determine that the response message includes the signed time stamp value in its Via header of the response message received in response to the SIP Options probing message), and (ii) storing in memory (e.g., cache) a time corresponding to when the response was received and the determination of whether the response was a successful acknowledgement or not.

Method Embodiment 23. The method of method embodiment 22 wherein said determining by the standby processing node whether the failure condition is a result of a failure of the active processing node includes: determining by the standby processing node that the active processing node has not failed when the determination of whether the response was a successful acknowledgement or not stored in memory was that the response was a successful acknowledgement and that the time which has elapsed since the response was received (e.g., stored time value) is not greater than a configured threshold value (i.e., the response is not stale).

Method Embodiment 24. The method of method embodiment 23 wherein said determining by the standby processing node whether the failure condition is a result of a failure of the active processing node further includes sending from the second communications IP interface of the standby processing node a second health check probing message (e.g., SIP Options message with signed time stamp value in Via header) to the active processing node second IP communications interface after said determining at the standby processing node that a failure condition exists and said response message to the health check message stored in memory was found to be equal to or greater than the configured threshold value (i.e., the response was stale); and determining that a failure of the active processing node exits when no response is received within a timeout period (e.g., a configured timeout period) to the second health check probing message or the response received is determined to not be a successful acknowledgement (e.g., the response does not include the signed time value in Via header); and determining that the active processing node has not failed when a successful acknowledgement response message to the health check probing message is received prior to said timeout period.

Method Embodiment 25. The method of method embodiment 24 further comprising: determining by the standby processing node that the high availability system is experiencing a split brain condition when said standby processing node determines that the active processing node has not failed.

Method Embodiment 26. The method of method embodiment 15 further comprising: wherein said determining by the standby processing node whether the failure condition is a result of a failure of the active processing node further includes: sending one or more additional probing messages to one or more external devices when the standby processing node does not receive an acknowledgement message from the active processing node to the health check probing message sent to the active processing node, said one or more probing messages being sent using said second IP communications interface; determining that the active processing node has failed when the standby processing node receives an acknowledgement to one or more of the additional probing messages sent to the one or more external devices; and determining that the active processing node has not failed when the standby processing node does not receive an acknowledge to any of the additional probing messages sent to the one or more external devices.

Method Embodiment 27. The method of method embodiment 26 wherein said one or more additional probing messages are SIP Options messages.

Method Embodiment 28. The method of method embodiment 26 further comprising: determining by the standby processing node that the high availability system is experiencing a split brain condition when said standby processing node determines that the active processing node has not failed.

Method Embodiment 29. The method of method embodiment 28 further comprising: in response to determining that the high availability system is experiencing a split brain condition switching said standby processing node back to said standby mode of operation.

Method Embodiment 30. The method of method embodiment 26 wherein switching said standby processing node back to said standby mode of operation includes: ceasing processing of messages received on the first IP communications interface of the standby processing device, and de-activating said first IP communication interface of the standby processing node wherein the first IP communications Interface is placed in the dormant state.

Method Embodiment 31. The method of method embodiment 30 wherein said cluster of processing nodes consists of an active processing node and a standby processing node.

Method Embodiment 32. The method of method embodiment 1 wherein said step of determining at a standby processing node that a failure condition exists is performed by logic circuitry in the standby processing node.

Method embodiment 33. The method of method embodiments 1-32 wherein the cluster of processing nodes is a cluster of servers.

Method Embodiment 34. The method of method embodiments 1-33 wherein the standby processing node is a standby server and the active processing node is an active processing server.

LIST OF A SET OF EXEMPLARY NUMBERED SYSTEM EMBODIMENTS

System Embodiment 1. A high availability system comprising: a cluster of processing nodes, said cluster of processing nodes including a standby processing node and an active processing node; the standby processing node including a processor that controls the standby processing node to perform the following operations: determine that a failure condition exists, switch the standby processing node from a standby mode of operation to an active mode of operation in response to determining that a failure condition exists, and determine whether the high availability system is experiencing a split brain condition.

System Embodiment 2. The high availability system of system embodiment 1, wherein said split brain condition is a condition wherein both the standby processing node and another processing node of the cluster of processing nodes are both operating at the same time in active mode operation.

System Embodiment 3. The high availability system of system embodiment 1 wherein said operation to determinate that a failure condition exists includes determining that heart beat signals sent from an active processing node of the cluster of processing nodes have not been received by the standby processing node during a predetermined period of time.

System Embodiment 4. The high availability system of system embodiment 3 wherein said processor included in said standby processing node is further configured to control the standby processing node to perform the operation of: monitoring, by the standby processing node while said standby processing node is in said standby mode of operation, a dedicated high availability link for heart beat signals being transmitted by said active processing node to said standby processing node.

System Embodiment 5. The high availability system of system embodiment 4 where said active processing node does not transmit heartbeat messages over the dedicated high availability link when the active processing node stops operating in the active mode and switches to an inactive mode of operation or a standby mode of operation.

System Embodiment 6. The high availability system of system embodiment 4 wherein said high availability link is a high speed link directly connecting the active processing node to said standby processing node.

System Embodiment 7. The high availability system of system embodiment 6 wherein said high availability link is a wired link or a fiber optic link.

System Embodiment 8. The high availability system of system embodiment 4 wherein said active processing node transmits said heart signals to said standby processing node over said high availability link while in an active mode of operation.

System Embodiment 9. The high availability system of system embodiment 1 wherein said operation of determining at a standby processing node that a failure condition exists includes determining that keep alive messages sent from the active processing node of the cluster of processing nodes have not been received by the standby processing node during a predetermined period of time.

System embodiment 10. The high availability system of system embodiment 9 wherein said standby processing node includes: (i) a dedicated high availability link communications interface which connects the standby processing node to said active processing node, (ii) a first Internet Protocol (IP) communications interface for communicating with external devices, said first IP communications interface having a first Medium Access Control (MAC) address and a first Internet Protocol address, and (iii) a second Internet Protocol (IP) communications interface dedicated for sending and receiving health check messages having a second MAC address and second IP address.

System embodiment 11. The high availability system of system embodiment 10 wherein said active processing node includes: (i) a dedicated high availability link communications interface which connects the active processing node to said standby processing node, (ii) a first Internet Protocol (IP) communications interface for communicating with external devices, said first IP communications interface having the same Medium Access Control (MAC) address and Internet Protocol address as the first IP communications interface of the standby processing node, (iii) a second Internet Protocol (IP) communications interface dedicated for sending and receiving health check messages having a third MAC address and third IP address.

System Embodiment 12. The high availability system of system embodiment 10, wherein said processor included in the standby processing node is further configured to control the standby processing node to perform the operation of: maintaining, by said standby processing node, said first Internet Protocol (IP) communications interface having the first Medium Access Control (MAC) address and the first Internet Protocol address in a dormant state when said standby processing node is in said standby mode of operation.

System Embodiment 13. The high availability system of system embodiment 12, wherein said standby processing node does not receive and/or send IP messages or IP packets, e.g., of IP messages, using the first Internet Protocol communications interface while in said standby mode.

System Embodiment 14. The high availability system of system embodiment 12 wherein said operation of switching the standby processing node from a standby mode of operation to an active mode of operation in response to determining that a failure condition exists includes switching said first Internet Protocol communications interface having the first MAC address and first IP address from a dormant state to an active state, said dormant state being a state in which the first IP communications interface does not receive or transmit message using the first IP communications interface, said active state being a state in which the first IP communications interface receives and transmits messages using the first IP communications interface.

System Embodiment 15. The high availability system of system embodiment 14 wherein said operation of determining whether the high availability system is experiencing a split brain condition includes determining by the standby processing node whether the failure condition is a result of a failure of the active processing node.

System Embodiment 16. The high availability system of system embodiment 14 wherein said operation of determining whether the high availability system is experiencing a split brain condition includes determining by the standby processing node whether the failure condition is a result of: (i) an active processing node failure or (ii) a high availability link failure or a standby processing node failure.

System Embodiment 17. The high availability system of system embodiment 15 wherein said processor included in the standby processing node is further configured to control the standby processing node to perform the operation of: sending by the standby processing node a health check probing message to the active processing node using the second IP communications interface; and wherein said operation of determining by the standby processing node whether the failure condition is a result of a failure of the active processing node includes: determining by the standby processing node that the active processing node has not failed when the health check probing message sent to the active processing node has been successfully acknowledged by the active processing node.

System Embodiment 18. The high availability system of system embodiment 17 wherein the health check probing message is a SIP Options message.

System Embodiment 19. The high availability system of system embodiment 18 wherein the SIP Options message includes a signed time stamp value included as a parameter in the SIP Options message Via header.

System Embodiment 20. The high availability system of system embodiment 19 wherein said operation of determining by the standby processing node that the active processing node has not failed when the health check probing message sent to the active processing node has been successfully acknowledged by the active processing node includes: determining that the health check probing message sent to the active processing node has been successfully acknowledged by the active processing node when the standby processing node receives a reply message from the active processing node in response to the SIP Options messages and said reply message includes said signed time stamp value.

System Embodiment 21. The high availability system of system embodiment 20 wherein said processor included in the standby processing node is further configured to control the standby processing node to perform the operation of: generating by the standby processing node said signed time stamp value by encrypting a time stamp value corresponding to time at which the SIP Options message was created.

System Embodiment 22. The high availability system of system embodiment 15 wherein said processor included in the standby processing node is further configured to control the standby processing node to perform the operations of: sending from the second communications IP interface of the standby processing node a health check probing message (e.g., SIP Options message with signed time stamp value in Via header) to the active processing node second IP communications interface prior to said determining at a standby processing node that a failure condition exists; monitoring by the standby processing node for a response from the active processing node to the health check message on the second IP communications interface for a predetermined period of time (e.g., timeout period); when no response message is received during the predetermined period of time storing in memory the time and an indication that the health check has failed due to a timeout; when a response message is received by the standby processing node on the second IP communications interface from the active processing node in response to the health check message:
(i) determining by the standby processing node whether said received response message is a successful acknowledgement of the health check message (e.g., determine that the response message includes the signed time stamp value in its Via header of the response message received in response to the SIP Options probing message), and (ii) storing in memory (e.g., cache) a time corresponding to when the response was received and the determination of whether the response was a successful acknowledgement or not.

System Embodiment 23. The high availability system of system embodiment 22 wherein said operation of determining by the standby processing node whether the failure condition is a result of a failure of the active processing node includes: determining by the standby processing node that the active processing node has not failed when the determination of whether the response was a successful acknowledgement or not stored in memory was that the response was a successful acknowledgement and that the time which has elapsed since the response was received (e.g., stored time value) is not greater than a configured threshold value (i.e., the response is not stale).

System Embodiment 24. The high availability system of system embodiment 23 wherein said operation of determining by the standby processing node whether the failure condition is a result of a failure of the active processing node further includes sending from the second communications IP interface of the standby processing node a second health check probing message (e.g., SIP Options message with signed time stamp value in Via header) to the active processing node second IP communications interface after said determining at the standby processing node that a failure condition exists and said response message to the health check message stored in memory was found to be equal to or greater than the configured threshold value (i.e., the response was stale); and determining that a failure of the active processing node exits when no response is received within a timeout period (e.g., a configured timeout period) to the second health check probing message or the response received is determined to not be a successful acknowledgement (e.g., the response does not include the signed time value in Via header); and determining that the active processing node has not failed when a successful acknowledgement response message to the health check probing message is received prior to said timeout period.

System Embodiment 25. The high availability system of system embodiment 24 wherein said processor included in the standby processing node is further configured to control the standby processing node to perform the operation of: determining by the standby processing node that the high availability system is experiencing a split brain condition when said standby processing node determines that the active processing node has not failed.

System Embodiment 26. The high availability system of system embodiment 15 wherein said operation of determining by the standby processing node whether the failure condition is a result of a failure of the active processing node further includes: sending one or more additional probing messages to one or more external devices when the standby processing node does not receive an acknowledgement message from the active processing node to the health check probing message sent to the active processing node, said one or more probing messages being sent using said second IP communications interface; determining that the active processing node has failed when the standby processing node receives an acknowledgement to one or more of the additional probing messages sent to the one or more external devices; and determining that the active processing node has not failed when the standby processing node does not receive an acknowledge to any of the additional probing messages sent to the one or more external devices.

System Embodiment 27. The high availability system of system embodiment 26 wherein said one or more additional probing messages are SIP Options messages.

System Embodiment 28. The high availability system of system embodiment 26 wherein said processor included in the standby processing node is further configured to control the standby processing node to perform the operation of: determining that the high availability system is experiencing a split brain condition when said standby processing node determines that the active processing node has not failed.

System Embodiment 29. The high availability system of system embodiment 28 wherein said processor included in the standby processing node is further configured to control the standby processing node to switch the standby processing node back to the standby mode of operation in response to determining that the high availability system is experiencing a split brain condition.

System Embodiment 30. The high availability system of system embodiment 26 wherein switching said standby processing node back to said standby mode of operation includes: ceasing processing of messages received on the first IP communications interface of the standby processing device, and de-activating said first IP communication interface of the standby processing node wherein the first IP communications Interface is placed in the dormant state.

System Embodiment 31. The high availability system of system embodiment 30 wherein said cluster of processing nodes consists of an active processing node and a standby processing node.

System Embodiment 32. The high availability system of system embodiment 1 wherein said operation of determining at the standby processing node that a failure condition exists is performed by logic circuitry in the standby processing node.

System Embodiment 33. The high availability system of system embodiments 1-32 wherein the cluster of processing nodes is a cluster of servers.

System Embodiment 34. The high availability system of system embodiments 1-33 wherein the standby processing node is a standby server and the active processing node is an active processing server.

LIST OF A SET OF EXEMPLARY NUMBERED COMPUTER MEDIUM READABLE EMBODIMENTS

Computer Readable Medium Embodiment 1. A non-transitory computer readable medium including a first set of computer executable instructions which when executed by a processor of a standby processing node of a high availability system including a cluster of processing nodes cause the standby processing node to: determine at a standby processing node that a failure condition exists, said standby processing node being one of the cluster of processing nodes; switch the standby processing node from a standby mode of operation to an active mode of operation in response to determining that a failure condition exists; and determine whether the high availability system is experiencing a split brain condition.

Computer Readable Medium Embodiment 2. The computer readable medium of computer readable medium embodiment 1, wherein said split brain condition is a condition wherein both the standby processing node and another processing node of the cluster of processing nodes are both operating at the same time in active mode operation.

Computer Readable Medium Embodiment 3. The computer readable medium embodiment of computer readable medium embodiment 1 wherein said operation to determinate that a failure condition exists includes determining that heart beat signals sent from an active processing node of the cluster of processing nodes have not been received by the standby processing node during a predetermined period of time.

Computer Readable Medium Embodiment 4. The computer readable medium embodiment of computer readable medium embodiment 1 wherein said instructions which when executed by said processor further cause the standby processing node to: control the standby processing node to perform the operation of: monitoring, by the standby processing node while said standby processing node is in said standby mode of operation, a dedicated high availability link for heart beat signals being transmitted by said active processing node to said standby processing node.

While the methods, algorithms, and mechanisms described herein have been mainly described in connection with a single active/standby node/server pair deployment, one of skill in the art will readily understand the methods, algorithms and mechanisms can be utilized for other redundancy models where the number of active and/or standby nodes/servers is greater than one.

The aforementioned methods, apparatus and systems can be used to eliminate and/or mitigate the occurrences of split brain conditions in high availability systems and the resulting problems caused by split brain conditions solving the technological problem of how to eliminate, reduce and/or mitigate the occurrences of split brain conditions in mission critical systems, e.g., network communications systems, in an effective and efficient manner.

The techniques of various embodiments may be implemented using software, hardware and/or a combination of software and hardware. Various embodiments are directed to apparatus, e.g., high availability system, node, servers, computing devices, network nodes, user equipment and/or network equipment devices. Various embodiments are also directed to methods, e.g., method of controlling and/or operating devices such as high availability system, node, servers, computing devices, network nodes, user equipment and/or network equipment devices. Various embodiments are also directed to machine, e.g., computer, readable medium, e.g., ROM, RAM, CDs, hard discs, etc., which include machine readable instructions for controlling a machine to implement one or more steps of a method. The computer readable medium is, e.g., non-transitory computer readable medium.

It is understood that the specific order or hierarchy of steps in the processes and methods disclosed is an example of exemplary approaches. Based upon design preferences, it is understood that the specific order or hierarchy of steps in the processes and methods may be rearranged while remaining within the scope of the present disclosure. The accompanying method claims present elements of the various steps in a sample order, and are not meant to be limited to the specific order or hierarchy presented. In some embodiments, one or more processors are used to carry out one or more steps or elements of the described methods.

In various embodiments each of the steps or elements of a method are implemented using one or more processors. In some embodiments, each of the steps or elements is implemented using hardware circuitry.

In various embodiments nodes, servers, devices and/or elements described herein are implemented using one or more components to perform the steps corresponding to one or more methods, for example, message reception, signal processing, sending, comparing, determining and/or transmission steps. Thus, in some embodiments various features are implemented using components or in some embodiments logic such as for example logic circuits. Such components may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium, e.g., a non-transitory computer readable medium, including machine executable instructions for causing a machine, e.g., processor and associated hardware, to perform one or more of the steps of the above-described method(s). Some embodiments are directed to a device, e.g., sensors, call processing devices, gateways, session border, network nodes and/or network equipment devices, including a processor configured to implement one, multiple or all of the steps of one or more methods of the invention.

In some embodiments, the processor or processors, e.g., CPUs, of one or more devices, e.g., nodes such as processing devices, servers, computing devices are configured to perform the steps of the methods described as being performed by the nodes, servers, high availability system, or user equipment. The configuration of the processor may be achieved by using one or more components, e.g., software components, to control processor configuration and/or by including hardware in the processor, e.g., hardware components, to perform the recited steps and/or control processor configuration. Accordingly, some but not all embodiments are directed to a device, e.g., node such as high availability system, node, server, user equipment with a processor which includes a component corresponding to each of the steps of the various described methods performed by the device in which the processor is included. In some but not all embodiments a device, e.g., node, server, equipment, includes a component corresponding to each of the steps of the various described methods performed by the device in which the processor is included. The components may be implemented using software and/or hardware.

Some embodiments are directed to a computer program product comprising a computer-readable medium, e.g., a non-transitory computer-readable medium, comprising code for causing a computer, or multiple computers, to implement various functions, steps, acts and/or operations, e.g. one or more steps described above. Depending on the embodiment, the computer program product can, and sometimes does, include different code for each step to be performed. Thus, the computer program product may, and sometimes does, include code for each individual step of a method, e.g., a method of controlling a computing device, node, server or high availability system. The code may be in the form of machine, e.g., computer, executable instructions stored on a computer-readable medium, e.g., a non-transitory computer-readable medium, such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a communications device such as a node, server, high availability system or other device described in the present application.

Numerous additional variations on the methods and apparatus of the various embodiments described above will be apparent to those skilled in the art in view of the above description. Such variations are to be considered within the scope. Numerous additional embodiments, within the scope of the present invention, will be apparent to those of ordinary skill in the art in view of the above description and the claims which follow. Such variations are to be considered within the scope of the invention.

What is claimed is:

1. A method of operating a high availability system including a cluster of processing nodes comprising:
    determining, by a standby processing node, that a failure condition exists, said standby processing node being one of the cluster of processing nodes;
    in response to determining, by the standby processing node, that a failure condition exists, making a determination, by the standby processing node, whether switching from a standby mode of operation to an active mode of operation will result in a split brain condition for the high availability system; and
    when the determination is that switching from a standby mode of operation to an active mode of operation will result in a split brain condition for the high availability system, refraining, by the standby processing node, from switching from a standby mode of operation to an active mode of operation; and
    wherein said making a determination, by the standby processing node, whether switching from a standby mode of operation to an active mode of operation will result in a split brain condition for the high availability system includes:
        determining, by the standby processing node, whether or not an active processing node of the cluster of processing nodes has failed; and
        when the determination is that the active processing node has not failed making the determination that switching by the standby processing node from a standby mode of operation to an active mode of operation will result in a split brain condition for the high availability system; and
    wherein said determining, by the standby processing node, whether or not the active processing node of the cluster of processing nodes has failed includes:
        retrieving, by the standby processing node, health check probe information for the active processing node from memory of the standby processing node;
        determining whether the retrieved health check probe information is stale; and
        when said health check probe information is determined not to be stale, determining whether or not the active processing node has failed based on the retrieved health check probe information; and
        when said health check probe information is determined to be stale, sending, by the standby processing node, a health check probe message from a first health check probing Internet Protocol (IP) communications interface of the standby processing node to a second health check probing IP communications interface of the active processing node.

2. The method of claim 1,
    wherein said split brain condition is a condition wherein both the standby processing node and the active processing node of the cluster of processing nodes are both operating in an active mode of operation at the same time using the same Medium Access Control (MAC) address and the same Internet Protocol (IP) address to transmit messages to external devices which are not part of the cluster of processing nodes.

3. The method of claim 2,
    wherein said standby processing node includes:
        (i) a first dedicated high availability link communications interface which connects the standby processing node to said active processing node,
        (ii) a first service Internet Protocol (IP) communications interface for communicating with external devices, said first service IP communications interface having a first Medium Access Control (MAC) address and a first Internet Protocol (IP) address, and
        (iii) the first health check probing Internet Protocol (IP) communications interface, said first health check probing IP communications interface being dedicated for sending and receiving health check messages, said first health check probing IP communications interface having a second MAC address and second IP address.

4. The method of claim 3 further comprising:
    monitoring, by the standby processing node while said standby processing node is in a standby mode of operation, the first dedicated high availability link communications interface, for keep alive messages being transmitted by the active processing node of the cluster of processing nodes to said standby processing node; and
    wherein said determining, by the standby processing node, that a failure condition exists includes: determining that keep alive messages sent from the active processing node of the cluster of processing nodes to the standby processing node's first dedicated high availability link communications interface have not been received by the standby processing node during a predetermined period of time.

5. The method of claim 4,
    wherein said active processing node includes:
        (i) a second dedicated high availability link communications interface which connects the standby processing node to said active processing node,
        (ii) a second service Internet Protocol (IP) communications interface for communicating with external devices, said second service IP communications interface having the first Medium Access Control (MAC) address and the first Internet Protocol (IP) address, and
        (iii) the second health check probing Internet Protocol (IP) communications interface, said second health check probing IP communications interface being dedicated for sending and receiving health check messages, said second health check probing IP communications interface having a third MAC address and third IP address.

6. The method of claim 5 further comprising:
wherein said making a determination, by the standby processing node, whether switching from a standby mode of operation to an active mode of operation will result in a split brain condition for the high availability system further includes:
when the determination is that the active processing node has failed, making the determination that switching, by the standby processing node, from a standby mode of operation to an active mode of operation will not result in a split brain condition for the high availability system.

7. The method of claim 1, wherein said health check probe information for the active processing node includes information on a last time a health check probe message sent from the standby processing node's first health check probing IP communications interface to the active processing node's second health check probing IP communications interface was successfully acknowledged by the active processing node.

8. The method of claim 1, further comprising:
sending, by the standby processing node, health check probing messages from the first health check probing IP communications interface to the second health check probing IP communications interface of the active processing node while said standby processing node is in a standby mode of operation and prior to the standby processing node determining that a failure condition exists; and
receiving by the standby processing node responses to one or more of the health check probing messages from the active processing node.

9. The method of claim 8,
wherein the health check probing messages are Session Initiation Protocol (SIP) Options messages; and
wherein the responses are SIP response messages.

10. The method of claim 9, wherein each of the health check probing SIP Options messages includes a timestamp value signed by the standby processing node.

11. A high availability system comprising:
a cluster of processing nodes, said cluster of processing nodes including a standby processing node and an active processing node; and
wherein the standby processing node includes:
(i) memory,
(ii) a first health check probing Internet Protocol (IP) communications interface, and
(iii) a first processor, the first processor controlling the standby processing node to perform the following operations:
determining that a failure condition exists;
in response to determining, by the standby processing node, that a failure condition exists, making a determination, by the standby processing node, whether switching from a standby mode of operation to an active mode of operation will result in a split brain condition for the high availability system; and
when the determination is that switching from a standby mode of operation to an active mode of operation will result in a split brain condition for the high availability system, refraining, by the standby processing node, from switching from a standby mode of operation to an active mode of operation; and
wherein said operation of making a determination, by the standby processing node, whether switching from a standby mode of operation to an active mode of operation will result in a split brain condition for the high availability system includes:
determining, by the standby processing node, whether or not the active processing node has failed; and
when the determination is that the active processing node has not failed making the determination that switching by the standby processing node from a standby mode of operation to an active mode of operation, will result in a split brain condition for the high availability system; and
wherein said determining, by the standby processing node, whether or not the active processing node has failed includes:
retrieving, by the standby processing node, health check probe information for the active processing node from memory of the standby processing node;
determining whether the retrieved health check probe information is stale; and
when said health check probe information is determined not to be stale, determining whether or not the active processing node has failed based on the retrieved health check probe information; and
when said health check probe information is determined to be stale sending, by the standby processing node, a health check probe message from the first health check probing IP communications interface of the standby processing node to a second health check probing IP communications interface of the active processing node.

12. The high availability system of claim 11,
wherein said split brain condition is a condition wherein both the standby processing node and the active processing node of the cluster of processing nodes are both operating at the same time in an active mode operation.

13. The high availability system of claim 12,
wherein said standby processing node further includes:
(i) a first dedicated high availability link communications interface which connects the standby processing node to said active processing node, and
(ii) a first service Internet Protocol (IP) communications interface for communicating with external devices, said first service IP communications interface having a first Medium Access Control (MAC) address and a first Internet Protocol (IP) address; and
wherein said first health check probing Internet Protocol (IP) communications interface is dedicated for sending and receiving health check messages; and
wherein said first health check probing IP communications interface has a second MAC address and second IP address.

14. The high availability system of claim 13, wherein said first processor further controls the standby processing node to perform the following additional operations:
monitor, by the standby processing node, while said standby processing node is in said standby mode of operation, the first dedicated high availability link communications interface for keep alive messages being transmitted by the active processing node to said standby processing node; and
wherein said operation of determining, by the standby processing node, that a failure condition exists includes determining that keep alive messages sent from the active processing node have not been received by the standby processing node during a predetermined period of time.

15. The high availability system of claim 14,
wherein said active processing node includes:
(i) a second dedicated high availability link communications interface which connects the standby processing node to said active processing node, and
(ii) a second service Internet Protocol (IP) communications interface for communicating with external devices, said second service IP communications interface having the first Medium Access Control (MAC) address and the first Internet Protocol address; and
wherein the second health check probing Internet Protocol (IP) communications interface is dedicated for sending and receiving health check messages; and
wherein said second health check probing IP communications interface has a third MAC address and third IP address.

16. The high availability system of claim 11,
wherein said operation of making a determination, by the standby processing node, whether switching from a standby mode of operation to an active mode of operation, will result in a split brain condition for the high availability system further includes:
when the determination is that the active processing node has failed, making the determination that switching, by the standby processing node, from a standby mode of operation to an active mode of operation will not result in a split brain condition for the high availability system.

17. The high availability system of claim 11, wherein said health check probe information for the active processing node includes information on a last time a health check probe message sent from the standby processing node's first health check probing IP communications interface to the active processing node's second health check probing IP communications interface was successfully acknowledged by the active processing node.

18. A non-transitory computer readable medium including a first set of computer executable instructions which when executed by a processor of a standby processing node of a high availability system including a cluster of processing nodes cause the standby processing node to:
determine that a failure condition exists;
in response to determining by the standby processing node that a failure condition exists, making a determination, by the standby processing node, whether switching from a standby mode of operation to an active mode of operation, will result in a split brain condition for the high availability system; and
when the determination is that switching from a standby mode of operation to an active mode of operation will result in a split brain condition for the high availability system, refraining, by the standby processing node, from switching from a standby mode of operation to an active mode of operation;
wherein said making a determination, by the standby processing node, whether switching from a standby mode of operation to an active mode of operation will result in a split brain condition for the high availability system includes:
determining, by the standby processing node, whether or not an active processing node of the cluster of processing nodes has failed; and
when the determination is that the active processing node has not failed, making the determination that switching, by the standby processing node, from a standby mode of operation to an active mode of operation will result in a split brain condition for the high availability system; and
wherein said determining, by the standby processing node, whether or not the active processing node of the cluster of processing nodes has failed includes:
retrieving, by the standby processing node, health check probe information for the active processing node from memory of the standby processing node;
determining whether the retrieved health check probe information is stale; and
when said health check probe information is determined not to be stale, determining whether or not the active processing node has failed based on the retrieved health check probe information; and
when said health check probe information is determined to be stale, sending, by the standby processing node, a health check probe message from a first health check probing Internet Protocol (IP) communications interface of the standby processing node to a second health check probing IP communications interface of the active processing node.

19. The non-transitory computer readable medium of claim 18,
wherein said health check probe information for the active processing node includes information on a last time a health check probe message sent from the standby processing node's first health check probing IP communications interface to the active processing node's second health check probing IP communications interface was successfully acknowledged by the active processing node.

20. The non-transitory computer readable medium of claim 18,
wherein said first set of computer executable instructions which when executed by the processor of the standby processing node further cause the standby processing node to:
monitor, by the standby processing node while said standby processing node is in a standby mode of operation, a first dedicated high availability link communications interface, for keep alive messages being transmitted by the active processing node of the cluster of processing nodes to said standby processing node; and
wherein said determining, by the standby processing node, that a failure condition exists includes: determining that keep alive messages sent from the active processing node of the cluster of processing nodes to the standby processing node's first dedicated high availability link communications interface have not been received by the standby processing node during a predetermined period of time.

\* \* \* \* \*